(12) United States Patent
Keller et al.

(10) Patent No.: US 8,066,227 B2
(45) Date of Patent: Nov. 29, 2011

(54) DEPLOYABLE STRUCTURES HAVING COLLAPSIBLE STRUCTURAL MEMBERS

(75) Inventors: Philip N. Keller, Longmont, CO (US);
Robert Taylor, Superior, CO (US);
Dana Turse, Broomfield, CO (US);
Larry G. Adams, Thornton, CO (US)

(73) Assignee: Composite Technology Development, Inc., Lafayette, CO (US)

( * ) Notice: Subject to any disclaimer, the term of this patent is extended or adjusted under 35 U.S.C. 154(b) by 0 days.

(21) Appl. No.: 13/036,199

(22) Filed: Feb. 28, 2011

(65) Prior Publication Data
US 2011/0204186 A1 Aug. 25, 2011

Related U.S. Application Data

(63) Continuation-in-part of application No. 12/873,615, filed on Sep. 1, 2010, which is a continuation of application No. 11/695,163, filed on Apr. 2, 2007, now Pat. No. 7,806,370.

(60) Provisional application No. 60/788,449, filed on Mar. 31, 2006, provisional application No. 61/310,205, filed on Mar. 3, 2010.

(51) Int. Cl.
*B64G 1/44* (2006.01)
(52) U.S. Cl. .......... 244/172.7; 244/159.4; 244/159.5; 244/159.6; 244/172.6
(58) Field of Classification Search .......... 244/159.4, 244/159.5, 159.6, 172.6, 120, 119, 122 A, 244/158.1, 172.7, 173.3; 136/245, 292
See application file for complete search history.

(56) References Cited

U.S. PATENT DOCUMENTS

| | | |
|---|---|---|
| 3,165,751 A | 1/1965 | Clark |
| 3,473,758 A | 10/1969 | Webb |
| 3,477,662 A | 11/1969 | Anderson |
| 3,510,086 A | 5/1970 | Arbeitlang et al. |
| 3,735,942 A | 5/1973 | Palz |
| 3,735,943 A | 5/1973 | Fayet |
| 3,817,481 A | 6/1974 | Berks et al. |
| 3,819,417 A | 6/1974 | Haynos |
| 3,863,870 A | 2/1975 | Andrews et al. |
| 4,133,501 A | 1/1979 | Pentlicki |
| 4,475,323 A | 10/1984 | Schwartzberg et al. |
| 4,636,579 A | 1/1987 | Hanak et al. |
| 4,713,492 A | 12/1987 | Hanak |
| 4,727,932 A | 3/1988 | Mahefkey |
| 4,747,567 A | 5/1988 | Johnson et al. |
| 4,787,580 A | 11/1988 | Ganssle |
| 5,296,044 A | 3/1994 | Harvey et al. |
| 5,487,791 A | 1/1996 | Everman et al. |
| 5,520,747 A | 5/1996 | Marks |
| 5,720,452 A | 2/1998 | Mutschler, Jr. |

(Continued)

OTHER PUBLICATIONS

International Search Report and Written Opinion of PCT/US11/26437 mailed on Jun. 27, 2011, 10 pages.

(Continued)

*Primary Examiner* — Tien Dinh
*Assistant Examiner* — Justin Benedik
(74) *Attorney, Agent, or Firm* — Kilpatrick Townsend & Stockton LLP

(57) ABSTRACT

Deployable structures are disclosed having collapsible structural members that include a stowed configuration with a volume smaller than the expanded configuration. Such structures can include and/or be used for litters, bridges, support structures, solar arrays, and more. These structures can be easily transported to a new location and deployed from the stowed configuration into a larger functional structure. In some embodiments these structures can use one or more slit-tube longerons that can have two resting states: deployed and rolled.

20 Claims, 20 Drawing Sheets

U.S. PATENT DOCUMENTS

| | | | |
|---|---|---|---|
| 5,785,280 | A | 7/1998 | Baghdasarian |
| 5,833,176 | A | 11/1998 | Rubin et al. |
| 5,857,648 | A | 1/1999 | Dailey et al. |
| 5,927,654 | A | 7/1999 | Foley et al. |
| 6,017,002 | A | 1/2000 | Burke et al. |
| 6,137,454 | A | 10/2000 | Peck |
| 6,228,441 | B1 | 5/2001 | Suzuki et al. |
| 6,343,442 | B1 | 2/2002 | Marks |
| 6,437,232 | B1 | 8/2002 | Dailey et al. |
| 6,478,261 | B2 | 11/2002 | Laraway et al. |
| 6,547,190 | B1 | 4/2003 | Thompson et al. |
| 6,568,638 | B1 | 5/2003 | Capots |
| 6,581,883 | B2 | 6/2003 | McGee et al. |
| 6,609,683 | B2 | 8/2003 | Bauer et al. |
| 6,637,702 | B1 | 10/2003 | McCandless |
| 6,702,976 | B2 | 3/2004 | Sokolowski |
| 6,772,479 | B2 | 8/2004 | Hinkley et al. |
| 6,775,046 | B2 | 8/2004 | Hill et al. |
| 6,872,433 | B2 | 3/2005 | Seward et al. |
| 6,983,914 | B2 | 1/2006 | Stribling et al. |
| 7,806,370 | B2 | 10/2010 | Beidleman et al. |
| 2007/0262204 | A1 | 11/2007 | Beidleman et al. |

OTHER PUBLICATIONS

Spence, Brian R., et al., "Mars Pathfinder Rover Egress Deployable Ramp Assembly", 30$^{th}$ Aerospace Mechanisms Symposium, NASA Langley Research Center, May 15-17, 1996, 16 pages.

International Search Report and Written Opinion of PCT/US2011/023782 mailed on Apr. 4, 2011, 7 pages.

International Search Report and Written Opinion of PCT/US2011/026745 mailed on May 10, 2011, 10 pages.

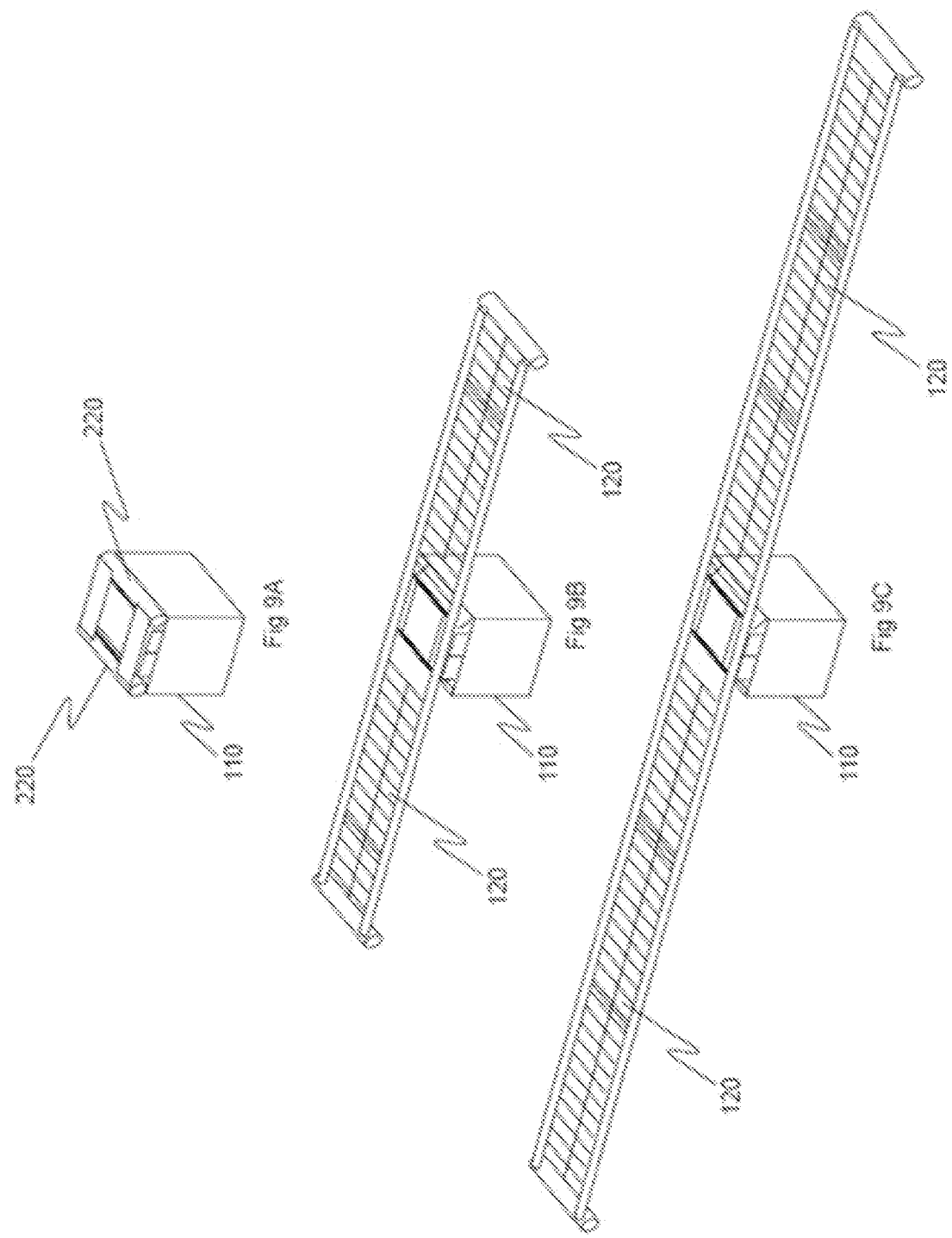

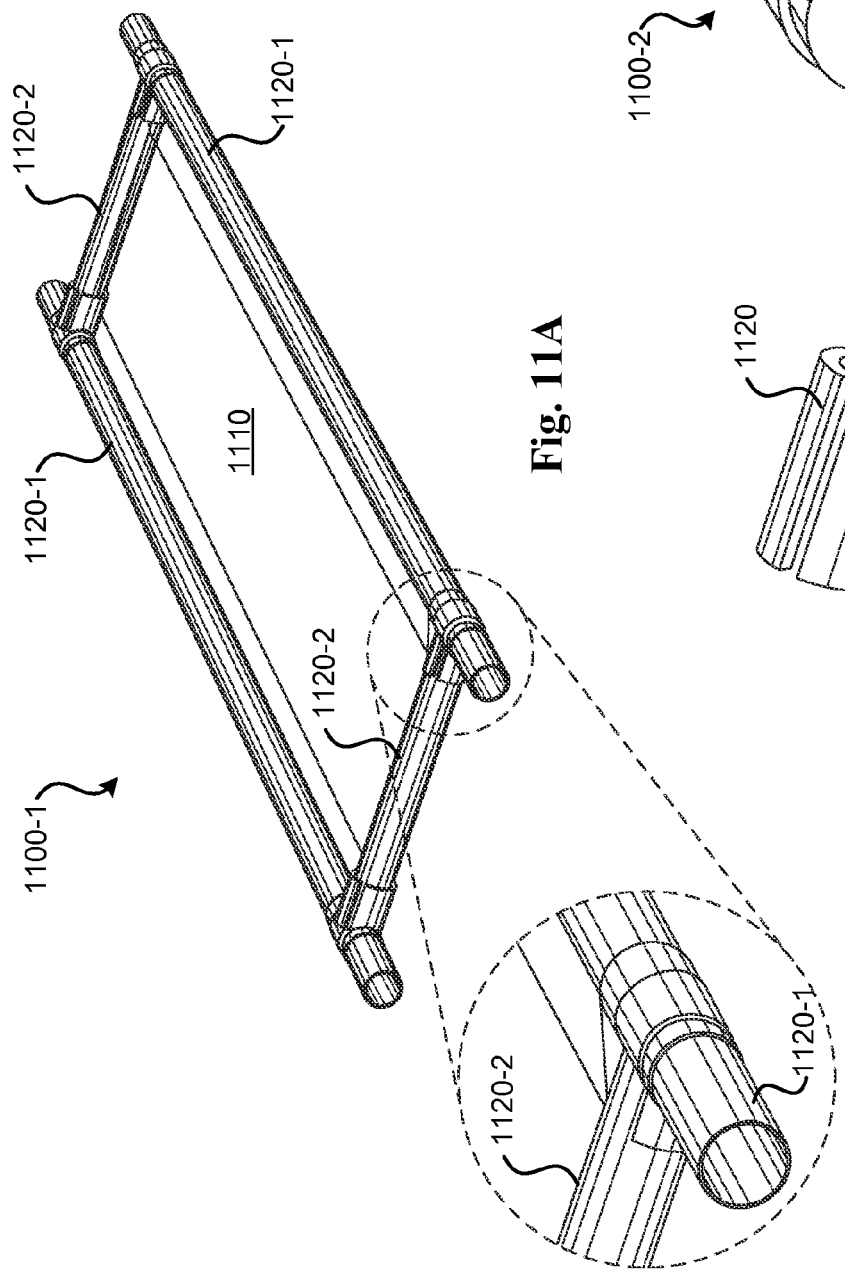
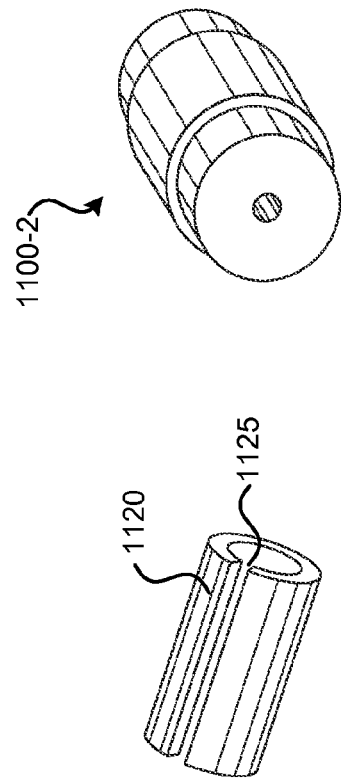
Fig. 11A
Fig. 11B
Fig. 11C

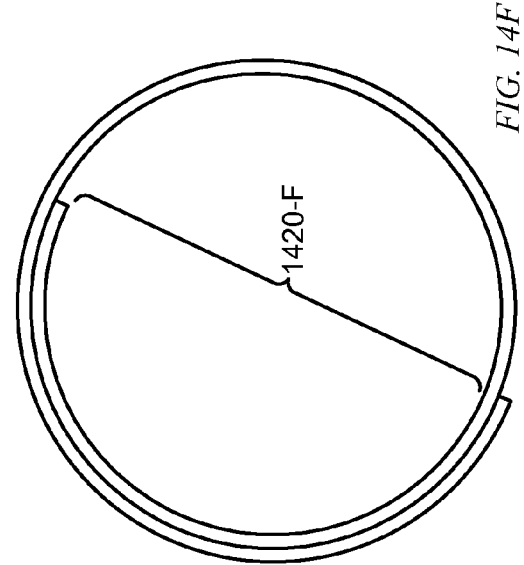
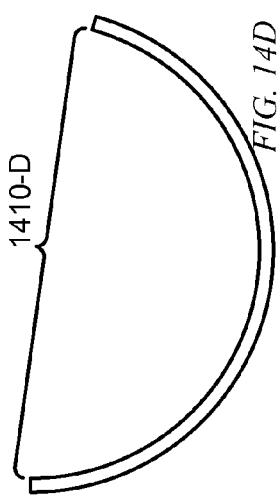
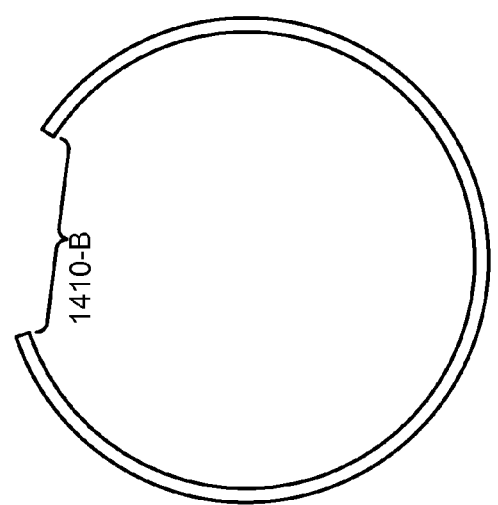
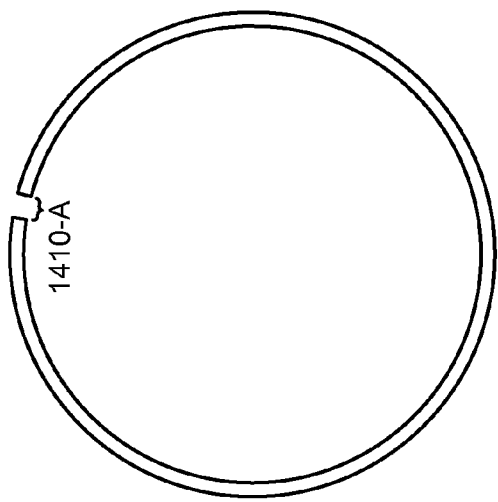
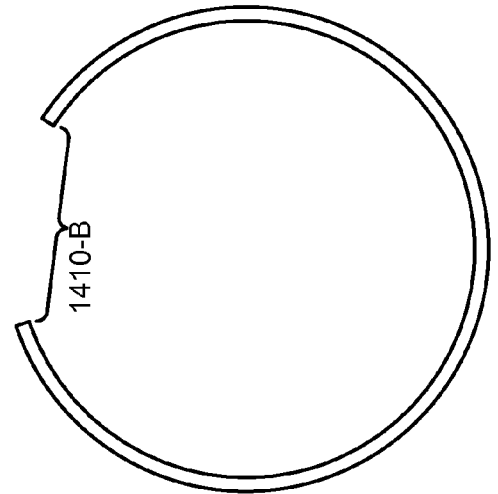
FIG. 14A  FIG. 14B  FIG. 14C  FIG. 14D  FIG. 14E  FIG. 14F

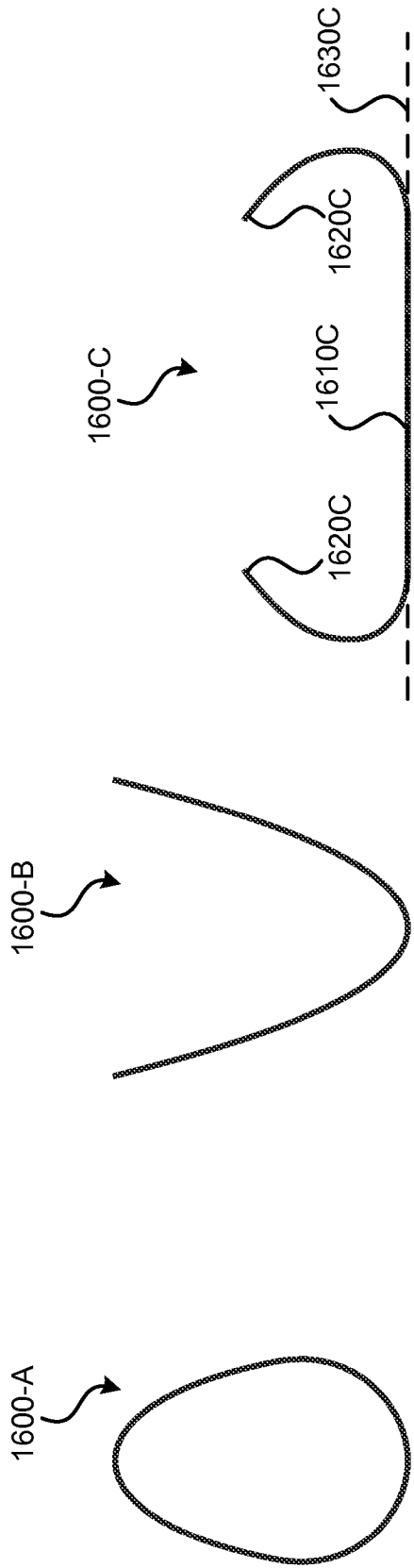

DEPLOYABLE STRUCTURES HAVING COLLAPSIBLE STRUCTURAL MEMBERS

CROSS-REFERENCES TO RELATED APPLICATIONS

This application is a continuation-in-part, and claims the benefit, of co-pending, commonly assigned U.S. patent application Ser. No. 12/873,615, filed Sep. 1, 2010, entitled "Large-Scale Deployable Solar Array," which is a continuation of U.S. patent application Ser. No. 11/695,163, filed Apr. 2, 2007, entitled "Large-Scale Deployable Solar Array," which is a non-provisional of and claims the benefit of co-pending, commonly assigned, U.S. Provisional Application No. 60/788,449, filed on Mar. 31, 2006, entitled "Large-Scale Deployable Solar Array," the entirety of which is herein incorporated by reference for all purposes. This application is also a non-provisional of and claims the benefit of U.S. Provisional Application No. 61/310,205, filed on Mar. 3, 2010, entitled "Collapsible Structures," the entirety of which is herein incorporated by reference for all purposes.

STATEMENT AS TO RIGHTS TO INVENTIONS MADE UNDER FEDERALLY SPONSORED RESEARCH AND DEVELOPMENT

The U.S. Government may have rights in this invention pursuant to Contract No. FA9453-04-M-0302

BACKGROUND OF THE INVENTION

This invention relates to deployable structures and, in particular, to deployable structures having both stowed and deployed configurations.

Deployable structures, such as litters, bridges, support structures, window shades, shower curtains, tents, habitats, and solar arrays, having rigid structures can be effectively packaged and deployed. When deployed, the shape of such structures can be maintained. These structures can include flexible members, but the flexible members are typically deployed using a separate boom or booms.

For example, thin photovoltaic arrays have been used for the original solar arrays on the Hubble Space Telescope and for the primary solar arrays on the International Space Station (ISS). The Hubble arrays were packaged in a roll and deployed with booms mounted on either side of the roll that pull the roll out into a sheet as they extend. The ISS arrays were packaged into a stack by folding and pleating a long, thin sheet of material that is deployed with a single boom mounted underneath the array that pulls the stack into a sheet as it extends.

SUMMARY OF THE INVENTION

Deployable structures are disclosed having collapsible structural members that have a stowed configuration with a volume smaller than the expanded configuration. Such structures can include and/or be used for litters, bridges, support structures, window shades, shower curtains, tents, habitats, solar arrays, and more. These structures can be easily transported to a new location and deployed from the stowed configuration into a larger functional structure. In some embodiments these structures can use one or more longerons that can have two resting states: deployed and rolled.

One embodiment provides for a deployable solar array comprising a single-bodied structural member, expandable along a longitudinal length, where a cross-sectional profile of the single-bodied structural member along at least a portion of the longitudinal length includes a substantially flat portion extending along a plane and curved edges extending in a direction out of the plane of the substantially flat portion. The deployable solar array also can include a plurality of photovoltaic cells coupled with the substantially flat portion of the single-bodied structural member. The single-bodied structural member and the plurality of photovoltaic cells can be configured to be stowed as a roll comprising the single-bodied structural member and the plurality of photovoltaic cells, wherein the roll can be configured to deploy by being rolled along the longitudinal length of the single-bodied structural member.

This embodiment of a deployable solar array can be configured to have one or more of the following features. One or more support elements can be coupled with the single-bodied structural member. The one or more support elements can include a longeron, a batten, or a sheet comprising rigid material. The plurality of photovoltaic cells can comprise a photovoltaic cell laminate. The single-bodied structural member can be laminated within the photovoltaic cell laminate. One or more battens, where the one or more battens are laminated within the photovoltaic cell laminate.

Another embodiment of a structure described herein provides for a deployable solar array comprising one or more longerons, expandable along a longitudinal length and having a gap along the longitudinal length of the one or more longerons such that a cross-sectional profile of the one or more longerons along at least a portion of the one or more longerons comprises two edges. The deployable solar array further can have a structural member coupled with the one or more longerons at one of the two edges of the cross-sectional profile of the one or more longerons. The structural member has a substantially flat surface along at least a portion of the longitudinal length of the one or more longerons. Finally, the deployable solar array can include a plurality of photovoltaic cells coupled with the substantially flat surface of structural member. The one or more longerons, the structural member, and the plurality of photovoltaic cells can be configured to be stowed as a roll comprising the one or more longerons, the structural member, and the plurality of photovoltaic cells. The roll can be configured to deploy by being rolled along the longitudinal length of the one or more longerons.

This embodiment of a deployable solar array can be configured to have one or more of the following features. A cross-sectional profile of at least one of the one or more longerons can be non-circular. A cross-sectional profile of at least one of the one or more longerons can comprise a fraction of a circle. One or more support elements can be with the one or more longerons. The one or more support elements can include a longeron, a batten, or a sheet comprising pliable or rigid material. The plurality of photovoltaic cells can comprise a photovoltaic cell laminate. At least one of the one or more longerons can be laminated within the photovoltaic cell laminate.

Yet another embodiment of a structure described herein includes a deployable structure comprising one or more longerons, expandable along a longitudinal length. The deployable structure can include one or more battens coupled with the one or more longerons and configured to extend in a dimension perpendicular to the longitudinal length of the one or more longerons when the deployable structure is deployed. The deployable structure further can include a pliable material coupled with either or both of the one or more longerons, or the one or more battens. The one or more longerons, the one or more battens, and the pliable material can be configured to be stowed as a roll comprising the one or more longerons, the one or more battens, and the pliable material. The roll can be configured to deploy by being rolled along a longitudinal length of the one or more longerons.

This embodiment of a deployable structure can be configured to have one or more of the following features. The pliable material can be a polyester film. The pliable material can be configured to extend along the longitudinal length of the one or more longerons, and extend in a dimension perpendicular to the longitudinal length of the one or more longerons when the deployable structure is deployed. The deployable structure can comprise a spacecraft structure. At least one longeron of the one or more longerons can have a gap along the longitudinal length of the at least one longeron. A curved cross-sectional profile of the at least one longeron can be circular; and the edges of the longeron that extend along the gap can overlap circumferentially by up to 180 degrees. At least one longeron of the one or more longerons can have a cross-sectional profile that substantially forms a shape comprising a circle, an oval, an ellipse, a parabola, a substantially flat shape with one or more curved edges, or a polygon.

Other embodiments are contemplated herein. For example, another embodiment provides for a deployable structure including longerons having a slit along the longitudinal length of the longeron and one or more fasteners configured to close a longeron in a longitudinal shape. The longerons also can be coupled with connecting elements and stowed, with one or more connecting elements, as a roll. At least a portion of the longerons can be exposed when stowed. Connecting elements can include a longeron, a mesh surface, a sheet of pliable or rigid material, or a solar cell. Longerons can have a curved cross-sectional profile, and can be non-circular. Additionally or alternatively, edges of a longeron that extend along the longitudinal length of the longeron can overlap, including a circumferential overlap of up to 180 degrees or more. The deployable structure can comprise one or more of a terrestrial structure, a spacecraft structure, a portable structure, a litter, a bridge, a support structure, or a solar panel. Fasteners of the deployable structure can be at least partially embedded within one or more surfaces of the longerons and can include a chemical adhesive, interlocking members (such as hook-and-loop fasteners), interlocking surfaces, a latch, or a magnet. The deployable structure can also have a gimbal mount and or a satellite coupled with the longerons and connecting elements.

Another embodiment provides for a deployable structure with longerons comprising a shape memory material with a curved cross-sectional profile when deployed. Each longeron also can include a slit along the longitudinal length of the longeron. Connecting elements can be coupled with the one or more longerons, and both longerons and connecting elements can be stowed as a roll with at least a portion of the longerons exposed when stowed. This embodiment further contemplates the curved cross-sectional profile of some or all of the one or more longerons being non-circular or comprising a fraction of a circle. The deployable structures can also include longerons with one or more fasteners configured to close the longeron in a longitudinal shape. The deployable structure also can include a heating element coupled to at least one of the longerons.

Another embodiment of the invention provides for a deployable structure having a plurality of longerons comprising a shape memory material and a slit along the length of the longeron. The edges of the longerons extending along the longitudinal length of the longeron can overlap. One or more connecting elements can be coupled with each of the longerons, and the deployable structure can be stowed in a rolled configuration, the roll being rolled along a longitudinal length of the plurality of longerons. At least a portion of the plurality of longerons can be exposed when stowed. Furthermore, the deployable structure can include a heating element and can be configured to transition to a deployed configuration when at least one longeron is heated by the heating element. One or more fasteners can be configured to close the longerons in a longitudinal shape and can be at least partially embedded within surfaces of the longerons. As with embodiments above, the deployable structure can comprise one or more of a terrestrial structure, a spacecraft structure, a portable structure, a litter, a bridge, a support structure, or a solar panel. Additionally or alternatively, edges of a longeron that extend along the longitudinal length of the longeron can overlap, including a circumferential overlap of up to 180 degrees or more.

BRIEF DESCRIPTION OF THE DRAWINGS

FIGS. 9A-9C show a bi-directional deployment of solar array structures according to one embodiment of the invention.

FIGS. 11A-11C show a litter constructed using longerons, according to one embodiment.

FIGS. 14A-14F show cross sections of some embodiments of slit-tube longerons in a deployed configuration.

FIGS. 16A-16E show non-circular cross sections of some embodiments of longerons in a deployed configuration.

DETAILED DESCRIPTION OF THE INVENTION

Figure 1:
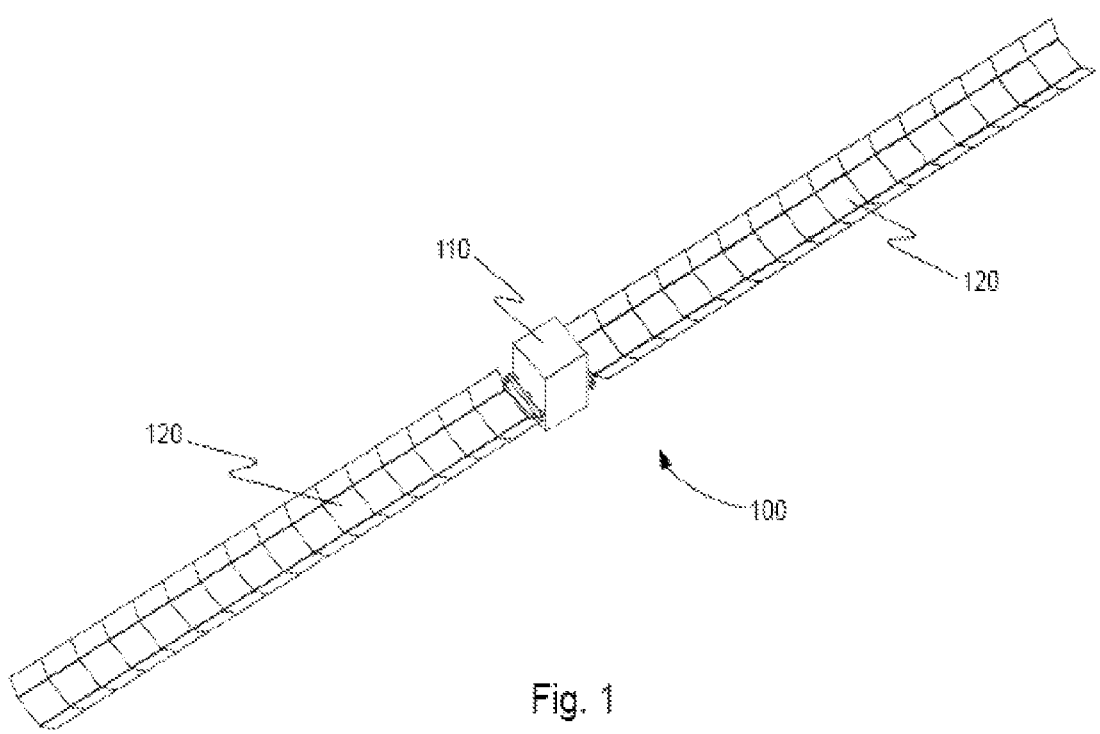
FIG. 1 shows two solar array structures coupled with a spacecraft according to one embodiment of the invention.

Embodiments of the present invention include collapsible structures constructed with one or more longerons, including slit-tube longerons. These structures can include, for example, load bearing structures, beams, support structures, litters, bridges, solar arrays, buildings, tents, etc. In some embodiments, collapsible structures can be rolled or stowed in a configuration with small volume and deployed in a configuration with a larger volume, depending on the structures. Some collapsible structures can include multiple slit-tube longerons in parallel and/or perpendicular configurations. In some embodiments sheet material can be coupled with the slit-tube longerons and expand between the spaces between the slit-tube longerons.

As discussed herein, longerons can include any elongated tubular material. Such longerons can have a cross-sectional profile comprising all or a portion of a circle, ellipse, curved, or polygonal shape. Moreover, a slit-tube longeron can include a slit along the longitudinal length of the slit-tube longeron. The slit can include a straight slit, curved, and/or jagged slit along the longitudinal length of the slit-tube longeron. In some embodiments discussed below, the slit can allow portions of the longeron to overlap or have a wide slit; the latter comprising a fractional tube longeron such that the a cross section of the longeron comprises an open shape.

Slit-tube longerons can have two configurations. A first configuration can include a rolled or stowed configuration. A second configuration can include an expanded or deployed configuration. In the rolled configuration the slit-tube longeron can flatten laterally and be rolled longitudinally. In the deployed configuration the slit-tube longeron can be extended longitudinally and rolled or curved laterally. The slit-tube longeron can be stable in both the first and second configurations.

Other slit-tube longerons can have a single rest state. That is, the slit-tube longeron can have a single stable state. For example, the deployed state can be stable and the rolled state unstable. Thus, in the rolled state the slit-tube longeron must be constrained in order to maintain the slit tube longeron in the rolled state. Once the constraints are released, the slit tube longeron will extend into the deployed state. A slit-tube longeron with such functionality can be utilized in various devices. For example, such a slit-tube longeron can be included in a de-orbiting satellite device in which the longeron is deployed to extend an atmospheric drag sail. An embodiment of a de-orbiting satellite device is described in further detail below.

In some embodiments, a slit-tube longeron can have multiple rest states. Such slit-tube longerons can be in a rest state at some point between the rolled and extended shape. Moreover, various other types of resting states can exist.

One application in which collapsible structures constructed with one or more such extendible longerons can be used is spacecraft. Spacecraft are limited in power, stowed volume, and mass available to meet requirements. These parameters are traded against each other as well as overall cost in spacecraft design. More efficient solar array packaging and mass would allow spacecraft to have more power on orbit or the same power for less mass and stowed volume. Additional power could be used, for example, to increase services for RF communications, provide power for electric propulsion, or increase the science capability of exploratory spacecraft. Similarly, additional stowed volume could be used, for example, for additional antennas for RF communications or larger science instruments. Also, a simpler solar array design could be fabricated and tested for a lower cost. Because of the extremely constrained nature of spacecraft design and because nearly all spacecraft require solar arrays for power, solar arrays with greater mass and volume efficiency could be used to increase the capability or decrease the cost of a spacecraft for any mission.

For purposes of illustration only, embodiments of invention involving spacecraft discussed herein are described herein in regard to a solar array subsystem which is deployed from an on-orbit spacecraft in zero gravity. Those skilled in the art will recognize that the embodiments of the invention may be applied to other applications.

Turning first to FIG. 1, a spacecraft 110 is shown with two deployed solar array structures 120 according to one embodiment of the invention. The solar array structures may be of any dimension. For example, each solar array structure 120 may be 5 feet across and 20 feet long (measured from the satellite to the end of the solar array). As another example, each solar array structure may be 20 feet wide and 50 feet long. As yet another example, each solar array structure may be 40 feet wide and 112 feet long. The size of the solar array may depend on the needs of the specific application, based in part, for example, on power needs, weight, and cost, but is not limited by the embodiments of the invention.

Figure 2:
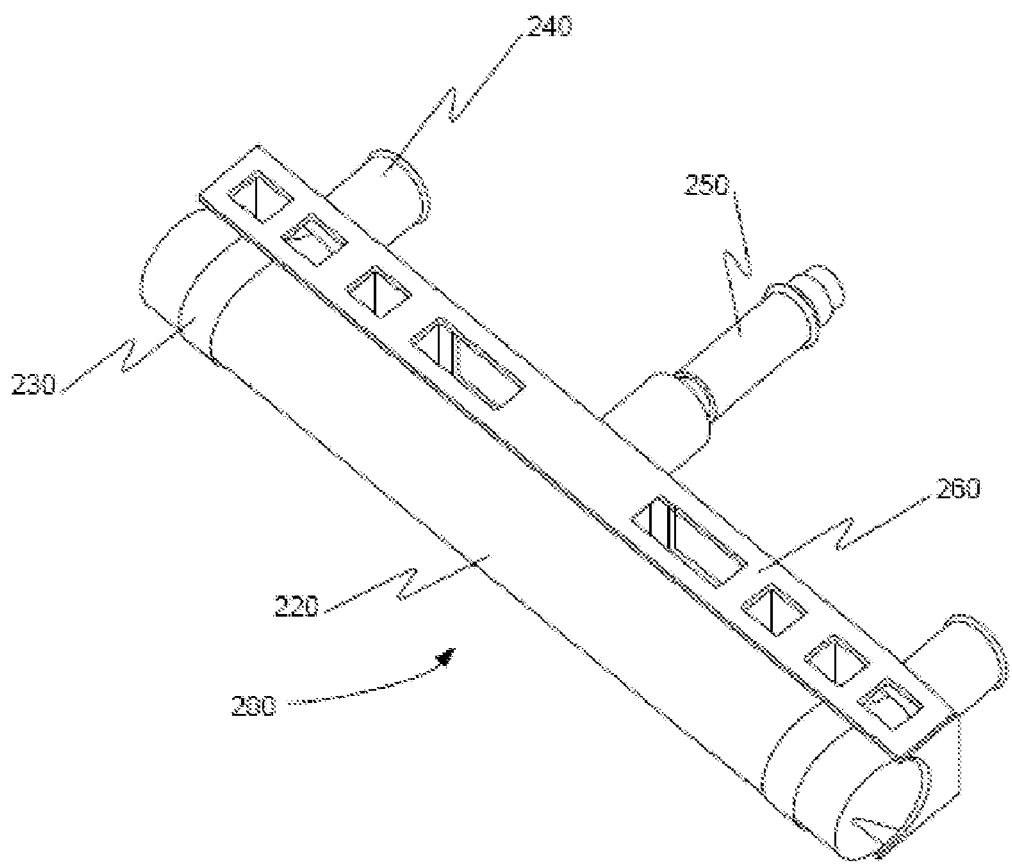
FIG. 2 shows a solar array structure in the rolled position couple and stowed with a yoke according to one embodiment of the invention.

FIG. 2 shows an undeployed, rolled solar array structure 220 attached to a yoke 260 according to one embodiment of the invention. The yoke 260 may be attached to a gimbal 250. The gimbal 250 may provide rotation of the solar array structure 120 in multiple dimensions. For example, the gimbal 250 may allow the structure, and hence the solar array structure 120 in this case, to be pointed toward the sun by the spacecraft 110 and its control system. Outboard from the gimbal 250 mount is a yoke 260. The yoke 260 may provide a load path between the solar array structure 120 and the gimbal 250 mount. It also provides a mechanism for supporting the rolled solar array, for example, during launch, deployment and while stowed in a rolled position.

Figure 3:
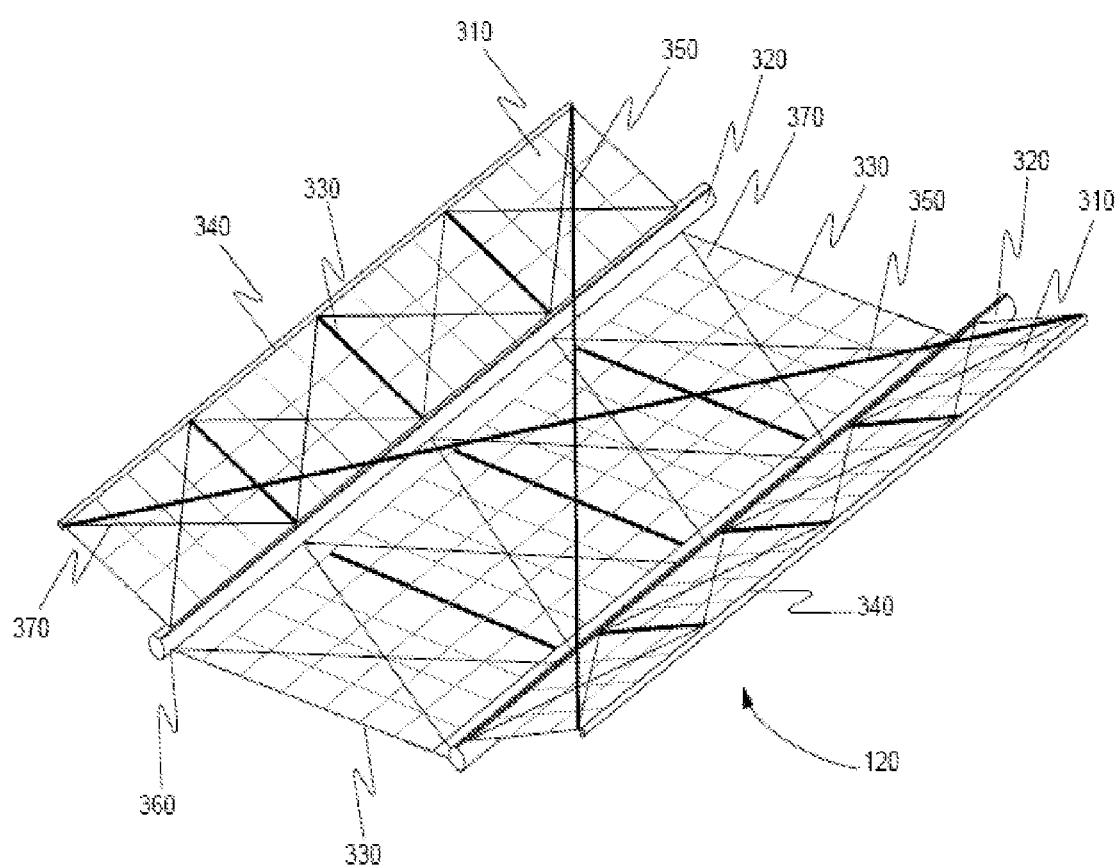
FIG. 3 shows a deployed solar array structure according to one embodiment of the invention.

FIG. 3 shows a solar array structure 120 in more detail according to one embodiment of the invention. This solar array has a central solar panel 300 and two wing solar panels 310. In this embodiment, the wing solar panels 310 are deployed to an angle not coplanar with the central solar panel 300. The wing solar panels 310 may alternatively be deployed coplanar with the central solar panel 300. Other embodiments of the invention may include a single central solar panel 300 without wing solar panels 310. Moreover, another embodiment may include a single central solar panel 300 and a single wing solar panel 310.

The solar array structure 120 may include two primary longerons 320, lateral battens 330, and wing edge longerons 340. The primary longerons 320 and the lateral battens 330 form structural panels. Other longerons and battens may be included for structural stability. Moreover, battens and longerons are not required. The central solar panel 300 and the wing solar panels 310 may be photovoltaic blankets. These photovoltaic blankets may include photovoltaic cells, such as, for example, silicon photovoltaic cells. The photovoltaic blankets may be, for example, thin film photovoltaics on a structural substrate or rigid cell photovoltaics on a mesh fabric. The photovoltaic cells may be grouped into panels. The photovoltaic cells may also be thin film photovoltaic cells. For example, the photovoltaic cells may include an amorphous silicon alloy or copper indium gallium deselinide cells deposited on a thin metallic or polyimide substrate.

Photovoltaics may be mounted on blanket assemblies and attached to a frame at junction points 360 along one of the primary longerons 320. Cable-style diagonals 370 may be included to stiffen both the central and wing solar panels.

Wing diagonals 350 connecting and supporting the two wing solar arrays may also be included. The diagonals provide shear and torsional rigidity when the structure is fully deployed.

Figure 4:
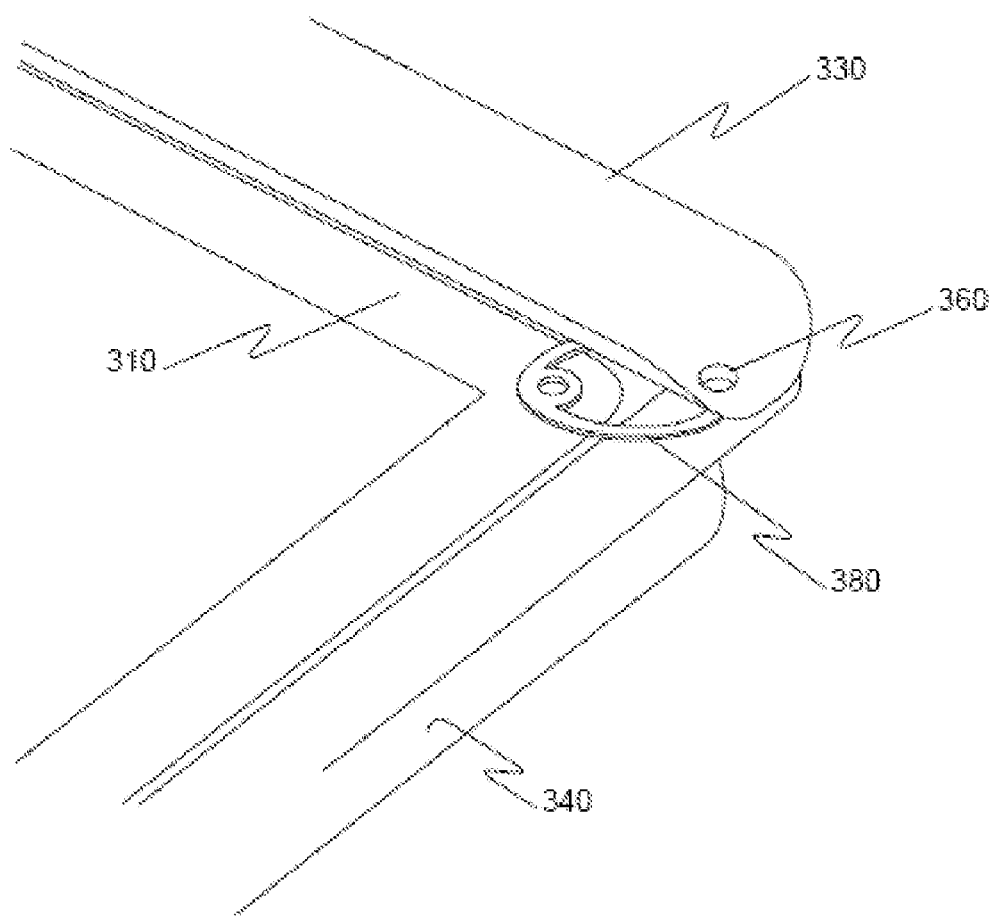
FIG. 4 shows a clip used to attach a solar blanket to a support structure according to one embodiment of the invention.

According to another embodiment of the invention, photovoltaic blankets may be attached to the frame junctions with clips 380 as shown in FIG. 4. The clips 380 may be attached at the junction point 360 of a wing edge longeron 340 and a batten 330. The clips 380 may allow for easy installation and removal of the photovoltaic blankets. They may include a spring to provide the preload necessary to tension the blanket inside of the frame sections. The soft spring also decreases the change in blanket tension due to manufacturing tolerances and any on-orbit distortions. The clips 380 with springs may also be set to decrease or eliminate tension being applied to the photovoltaic blanket. The photovoltaic blankets may be attached to the frame using other devices, such as for example, grommets, elastic cords, etc.

Figure 5:
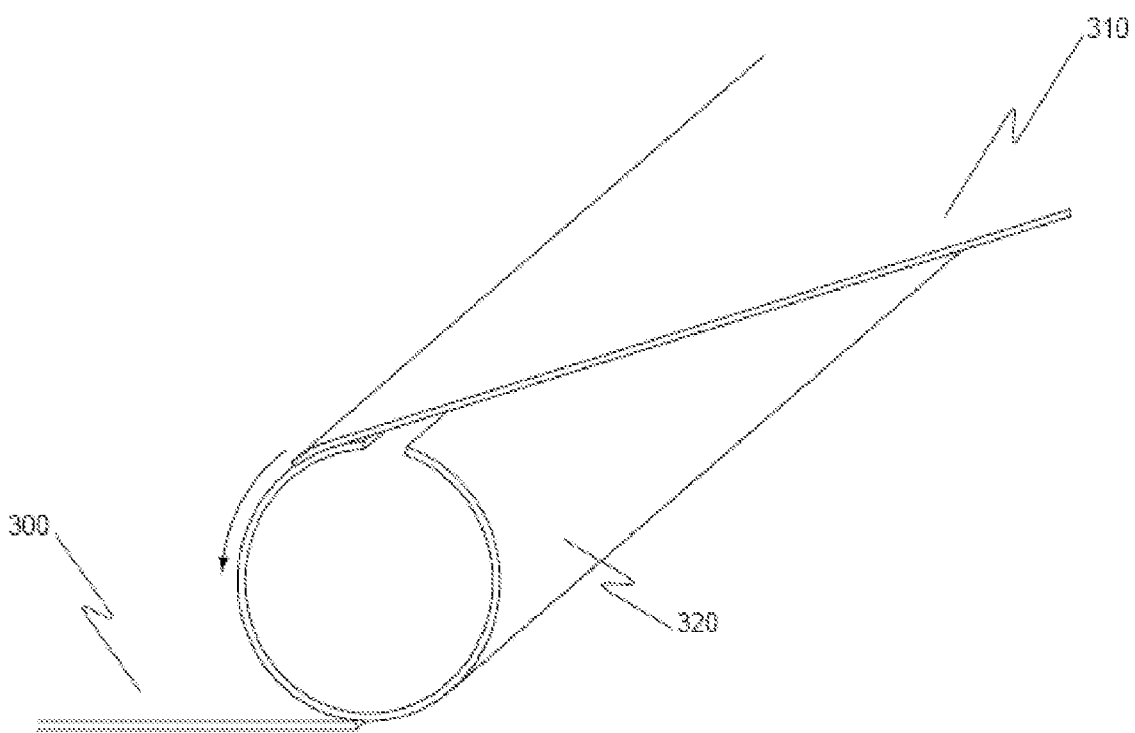
FIG. 5 shows a close up of a slit-tube longeron coupled with a central and wing solar panel according to one embodiment of the invention.

FIG. 5 shows a close up of a slit-tube primary longeron 320 coupled with a wing solar panel 310 and a central solar panel 300. The longerons are constructed such that they may be flattened and rolled for stowage while regaining their original cross-section during deployment. The primary longeron 320 may be a long tube with one or more slits. The slits may allow the tube to be flattened and rolled. The primary longeron 320 may be constructed from any elastic material or memory material, such as, for example, a metal, a composite, or a polymer. Many shape memory materials are known in the art. For example, the primary longerons 320 may comprise copper-zinc-aluminum, copper-aluminum-nickel, or nickel-titanium alloys. In another embodiment of the invention, the primary longerons 320 may be constructed from an elastic memory composite (EMC) material, such as, for example, TEMBO®, which is commercially available from Composite Technology Development, Inc. For added flexural properties the primary longerons 320 may have some curvature much like a carpenter's tape or may be stiffened by another mechanism such as a sandwich panel cross section with collapsed thickness for stowage.

Figure 6:
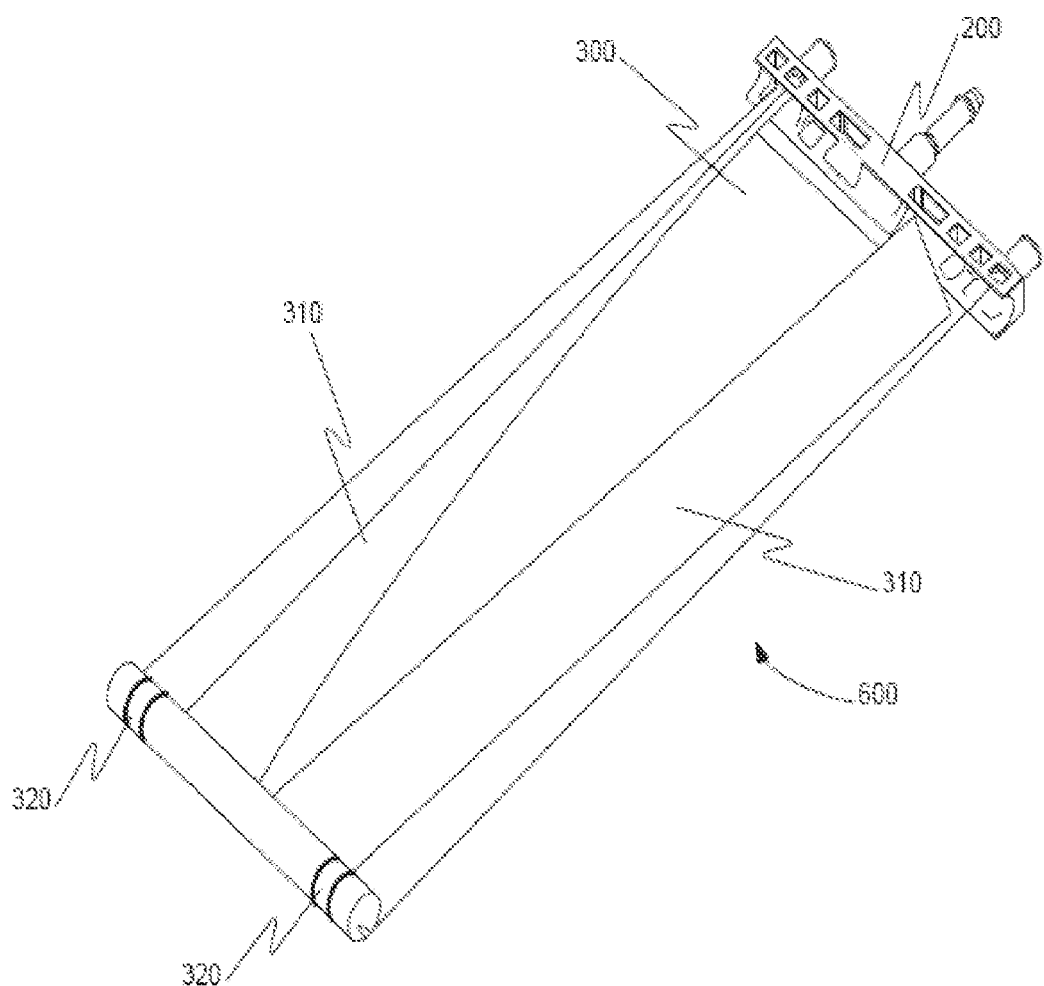
FIG. 6 shows a solar array structure being rolled according to one embodiment of the invention.

The primary longeron 320 may also act as wing hinge for the wing panels 310. The wing solar panels 310 may be folded onto the central solar panel 300 while the primary longeron 320 is flattened. This puts the three three-panel assembly (the two wing solar panels 310 and the central solar panel 300) into a single plane configuration which may then be rolled into a cylinder back to the yoke 260, as shown in FIG. 6. The rolled up array 220 may then be secured to the yoke 260 with a clamp band device 230 as shown in FIG. 2. Other mechanisms may be used to secure the rolled up array 220.

Figure 7A:
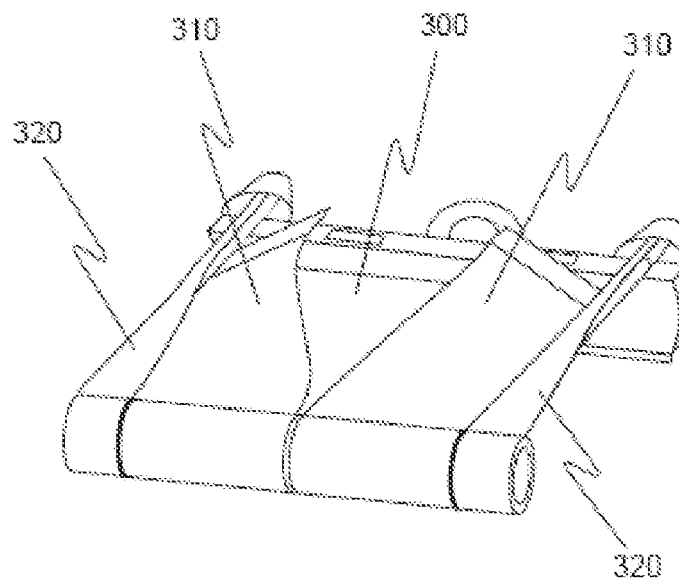
FIGS. 7A and 7B show a back-rolled and front-rolled solar array structure according to other embodiments of the invention.
Figure 7B:
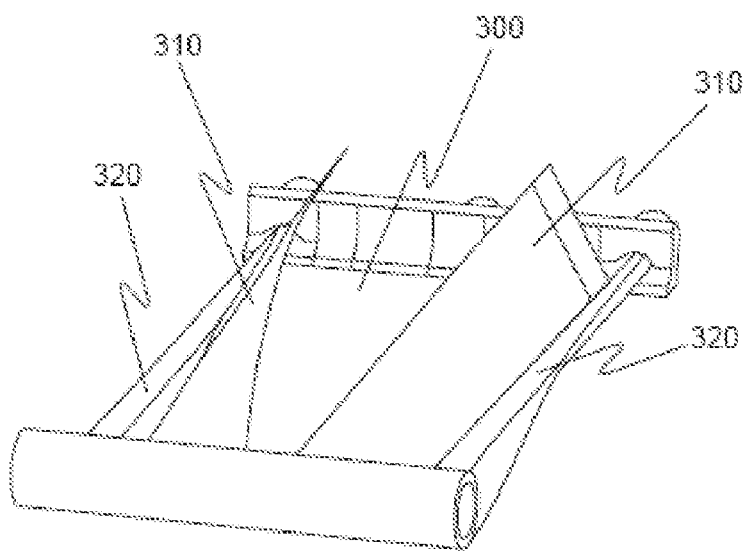

The solar arrays 300, 310 may be back-rolled as shown in FIG. 7A or front rolled as shown in FIG. 7B according to other embodiments of the invention. Back rolling occurs when the roll is above the plane of the deployed array. Front rolling occurs when the roll is below the plane of the deployed array. Moreover, the primary longerons 320 are exposed on the outside of the roll when back rolled and within the roll when front rolled. Reversing the roll direction may also change the attachment configuration of the wings to the rolled longeron.

The solar array structure 102 may be deployed by releasing the clamp band 230. The clamp band 230 provides initial kick-off force and pulls the rolled array away from the yoke 260. Additionally the clamp band 230 may provide supplementary root stiffness to the primary longeron. The deploying force is primarily derived from the strain energy stored in the rolled primary longeron; however, additional strain energy may also be stored in the other frame elements, which are flattened and rolled into the stowed configuration. While the primary longeron is unrolling, the wings may deploy due to their integral nature with the primary longerons. The wings are deployed as the flattened primary longeron is restored to its preformed shape. The deploying wing solar panels 310 may provide stability during deployment. The wing solar panels 310 may also decrease the ability for the rolled array to unfurl and then roll back on itself like a yo-yo. The wing solar panels 310 may also provide some depth to the structure, which in turn may control the deployment profile. This coordinated deployment also dissipates the stored energy into multiple kinetic energy paths (left wing, right wing, unfurling tip mass). This decreases the amount of force and moment that must be reacted and controlled by the host spacecraft when the structure reaches its final deployed position. When deployment is complete, the wing to wing diagonal members will be slightly tensioned through residual strain energy in the primary longerons.

Figure 8:
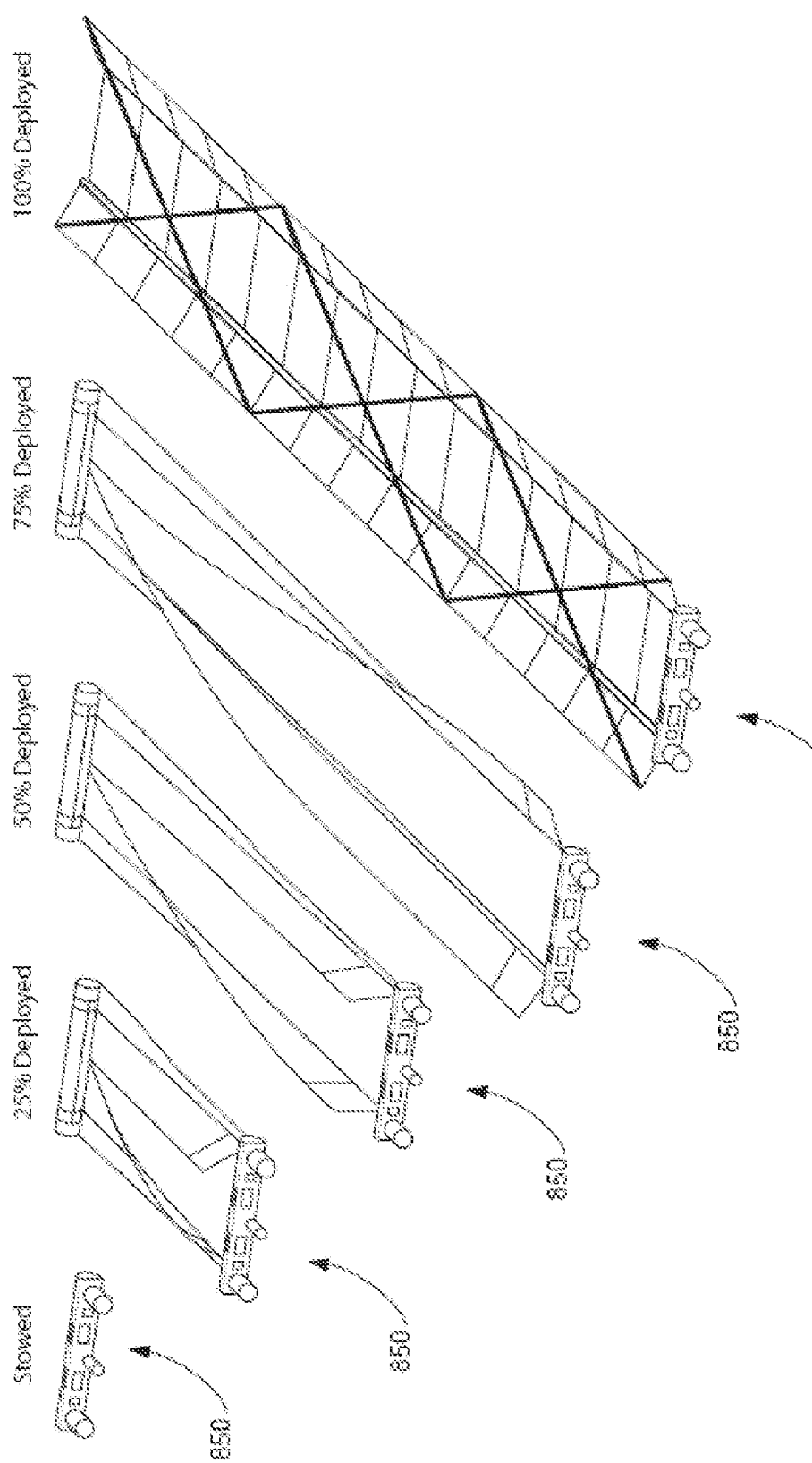
FIG. 8 shows the progression of a solar array structure from being stowed to fully deployed according to one embodiment of the invention.

FIG. 8 shows a progression as the structure is deployed according to one embodiment of the invention. The rolled array is stowed with the yoke 810. The figure then shows the solar array structure deployed over various phases from stowed 810 to 25% deployed to 50% deployed to 75% deployed to 100% deployed. The figure also shows how the wings are deployed during each stage of deployment.

Barreling and rate of deployment are controlled through the primary longeron 320. The longeron may include a bi-stable elastic design and/or include a shape memory material. The shape memory material may have integral heaters that are electronically controlled. The longerons may also be heated by solar energy. In such a case, the array may be back rolled so that the primary longerons 320 may be exposed to the sun when the array is rolled. Solar energy may then provide automatic deployment control because only the outside of the rolled longeron would be heated. The rate of unrolling would be limited because of the time required to heat the material to deployment temperature as it reaches the outside of the roll. Additional control could be added by using a spooled cable (not shown) attached to the tip of the primary longeron. The rate of cable release is controlled by a drag or braking mechanism mounted on the yoke 260.

In order for EMC material to regain its previous structure, both packaging and deployment may need to be accomplished above the materials glass transition temperature. In one embodiment, surface-bonded heaters may be used for packaging and deployment control of the slit-tube longerons. In another embodiment, solar energy may be used to deploy the solar array structures 120. Accordingly, the stowed and rolled structure may be turned toward the sun in such a way that the primary longerons 320 are heated. The heat causes the longerons to deploy by regaining a previously established shape.

FIGS. 9A-9C show a spacecraft 110 with bi-directional deployed solar array structures according to another embodiment of the invention. A space craft may have two rolled and stowed solar array structures 120 as shown in FIG. 9A. The two rolled and stowed solar array structures may begin deployment, as shown in FIG. 9B. FIG. 9C shows the two solar array structures 120 fully deployed in opposite directions. The solar array structures do not include wing solar panels.

Figure 10A:
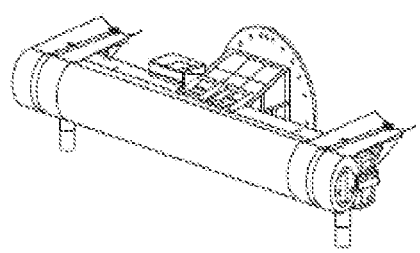
FIGS. 10A and 10B show another embodiment of a stowed and deployed solar array structure.
Figure 10B:
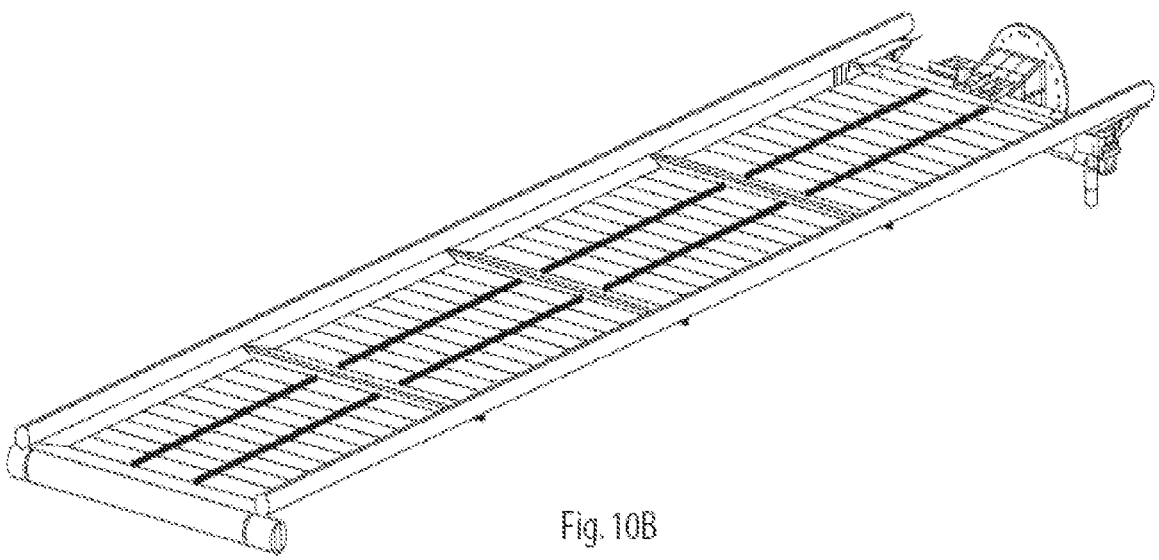

FIGS. 10A and 10B show a stowed and deployed solar array structure according to another embodiment of the invention. The embodiment shown in this figure shows a solar array structure coupled with a different yoke. The yoke may be adapted to rotate and/or position the solar array structure in a number of different positions. This solar array structure also includes only a central solar panel couple with two slit-tube longerons.

Although the collapsible structures constructed with one or more such extendible longerons described herein have applications in space-bound solar panel arrays as described above, other embodiments may be used for a wide variety of applications. Such applications can include, for example, load bearing structures, beams, support structures, litters, bridges, solar arrays, buildings, tents, etc. For example, FIG. 11A shows a litter 1100 constructed using longerons 1120 according to some embodiments. The litter has a deployed configuration 1100-1, shown in FIG. 11A, and a stowed configuration 1100-2, as shown in FIG. 11C. In some embodiments, the litter can include two longitudinal longerons 1120-1 and two lateral longerons 1120-2 with sheet material 1110 extending between at least the two lateral longerons 1120-2. In some embodiments, the longitudinal longerons 1120-1 in a deployed configuration 1100-1 can be slid through sleeves in the sheet material 1110. The lateral longerons 1120-2 then can be coupled with the longitudinal slit-tube longerons 1120-1.

The litter 1100 can be placed in a stowed configuration 1100-2 by uncoupling the longerons 1120 and the sheet material 1110 and rolling along the longitudinal length of the longerons 1120. The longerons 1120 and/or the sheet material 1110 can be rolled up together or singularly. In this stowed configuration 1100-2, the litter comprises a volume much smaller than the volume of the litter in the expanded configuration. In some embodiments, the litter 1100 can be rolled without decoupling any of the components. Additionally or alternatively, the sheet material 1110 can be rolled within longeron 1120. Various buckles and/or straps can be used for carrying the stowed and/or deployed litter 1100 and/or for securing a patient to the litter 1100. Finally, the litter 1100 can include slit-tube longerons, where one or more of the longerons 1120 includes a slit 1125 extending along at least a portion of the longitudinal length of the one or more longerons 1120, as shown in FIG. 11B.

Figure 12:
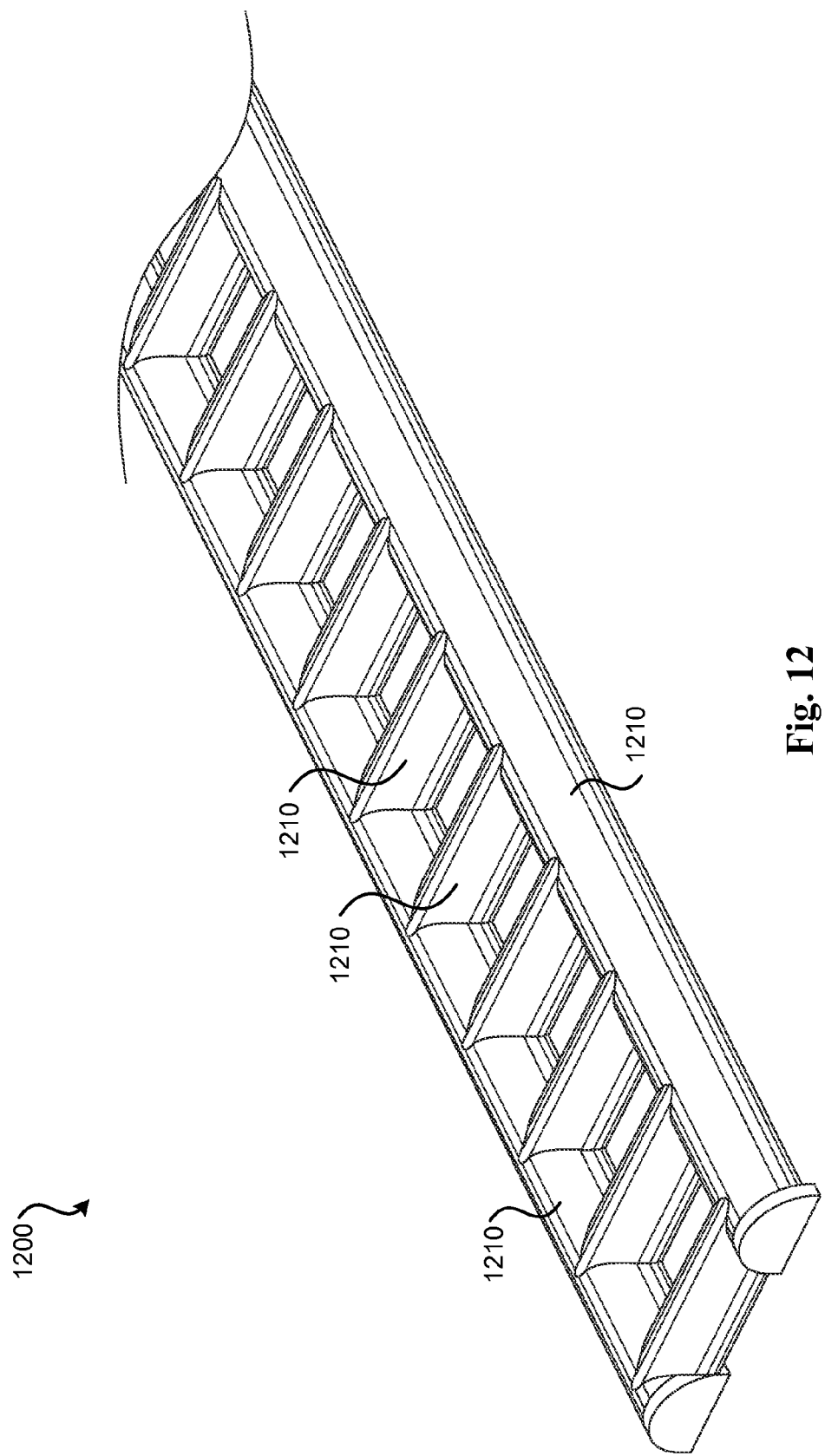
FIG. 12 shows an embodiment of another support structure constructed with longerons.
Figure 13:
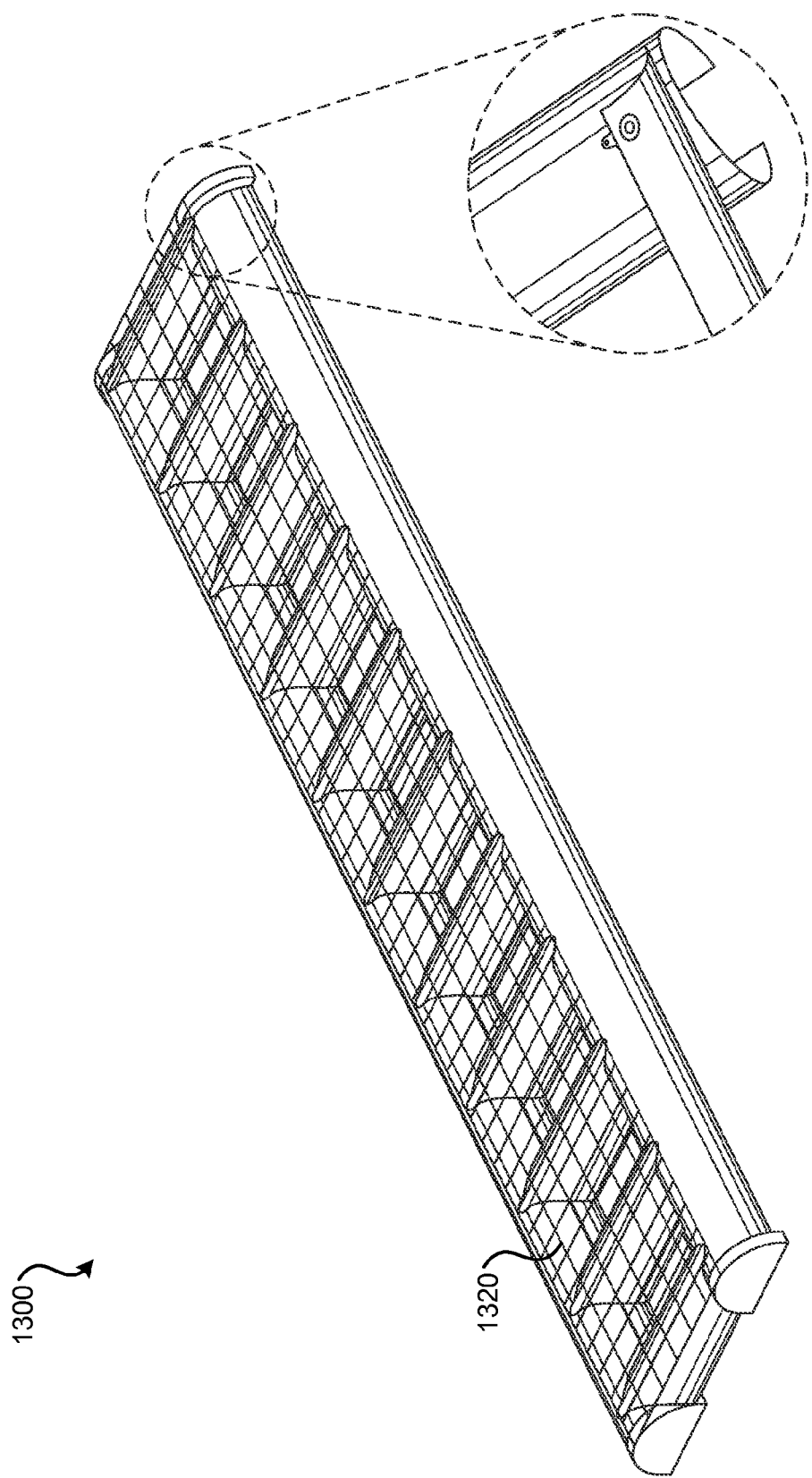
FIG. 13 shows yet another embodiment of a support structure, constructed with longerons and a mesh material.

FIG. 12 shows a support structure 1200 constructed with slit-tube longerons 1210 in rolled and extended configurations having certain dimensions, according to some embodiments of the invention. The support structure 1200 can be constructed in a manner similar to the litter 1100 described above. The support structure 1200 can include a number of longitudinal and transverse slit-tube longerons 1210. These longerons 1210 can be securely, permanently, partially, and/or removably coupled with each other in a number of configurations. The longerons 1210 can be coupled together and rolled as a group. Various widths and/or sizes can be used. FIG. 13 shows a support structure 1300 constructed with slit-tube longerons in a manner similar to the support structure 1200 of FIG. 12. Additionally, however, the support structure 1300 of FIG. 13 includes a mesh surface 1320 according to some embodiments of the invention. In some embodiments, the slit-tube longerons can include fractional-tube longerons as shown in the close up in FIG. 13.

As illustrated in the figures above, collapsible structures can comprise two longerons, including slit-tube longerons, deployed in parallel with various connecting elements coupled with the longerons. These connecting elements can include a variety of materials, members, and or structures that can be rolled up with one or both of the longerons or separately stowed when the collapsible structure is not deployed. Depending on the desired functionality of the collapsible structure, these connecting elements can include one or more additional longerons, mesh surfaces, sheets of pliable material (fabric, metal, etc.), rigid sheets or planks, solar cells, curved shades or window blinds, laminated continuous sheet material, and more.

FIGS. 14A-14F show cross sections of some embodiments of slit-tube longerons in a deployed configuration. These slit-tube longerons have various width slits 1410 (labeled with brackets in FIGS. 14A-14D), or are fractional tubes, or have various sized overlaps 1420 (labeled with brackets in FIGS. 14E-14F). These figures are not meant to be limiting, but are presented to show various different cross sections for slit-tube longerons.

As illustrated in FIGS. 14A-14D, the slit 1410 of a slit-tube longeron with a circular profile may exist when two edges of the longeron do not meet circumferentially. Slit-tube longerons can, in fact, be configured such that a cross-sectional profile only forms a fraction of a full shape, such as a circular arc. These fractional slit-tube longerons can come in various forms such as a three-quarter tube longeron, illustrated in FIG. 14C, and a half tube longeron, illustrated in 14D. In fact, fractional slit-tube longerons can include any fractional form. Moreover, slit-tube longerons having cross-sectional profile that forms only a small fraction of a circle or other shape can appear to look virtually flat, with only slight curvature. Thus, certain embodiments of slit-tube longerons may not appear tubular when deployed.

Additional embodiments contemplate other cross-sectional profiles. For example, FIGS. 14E-14F illustrate a slit-tube longeron with a circular cross-sectional profile with edges creating an overlap 1420. Such slit-tube longerons can be configured to have a little amount or a large amount of overlap 1420 based on desired functionality. For example, FIG. 14E illustrates a slit tube longeron with a small amount of overlap 1420-E, the overlap extending roughly 30 degrees circumferentially around the circular cross section. On the other hand, FIG. 14F illustrates a much larger overlap 1420-F, extending roughly 180 degrees circumferentially around the cross section. Some embodiments, in fact, can include an overlap of more than 180 degrees. Other embodiments contemplate slit tube longerons having various amounts of overlap, depending on factors such as desired functionality.

Whether the slit of a slit-tube longeron comprises a gap between edges of the slit-tube longeron or an overlap between the edges depends on desired functionality. For instance, slit-tube longerons having a large gap between the edges of the slit-tube longeron (for example, a slit-tube longeron having a circular cross-sectional profile forming a fraction of a circle) can be lighter than similarly-sized slit-tube longerons with little or no gap because the large-gapped slit-tube longerons use less material. Thus, large-gapped slit-tube longerons might be preferable for portable applications. Additionally, large-gapped slit-tube longerons can be easier to bend, and therefore would be preferable in applications requiring or preferring bendable slit-tube longerons. On a related note, large-gapped slit-tube longerons are also easier to flatten and roll up as compared with other longerons. Thus, large-gapped slit-tube longerons are particularly attractive for terrestrial structures where a person is likely to repeatedly roll and unroll the structure.

Large-gapped slit-tube longerons also can be desirable when making the slit-tube the integral portion of the structure. For instance, a non-circular longeron having a very large cross-section with a long, substantially flat inner surface opposite to the gap (forming a cross-section that looks like a "sled" or "toboggan") could be used for various purposes. For instance, a longeron with a very large cross section and a relatively narrow length could be used as a litter and/or a stretcher. In another embodiment, provided in more detail below, the longeron can include a solar array on the inner surface.

On the other hand, slit-tube longerons having little or no gap (including slit-tube longerons having overlapping sides) can be preferable in certain applications. For example, such longerons can be preferred where an inner surface of the slit-tube longeron needs protection from sunlight or where the longeron needs to be closed out (e.g., one or more of the edges of the slit-tube longeron needs to be secured to another edge or surface of the slit-tube longeron). These longerons are more difficult to flatten and roll up as compared with large-gapped slit-tube longerons, and therefore may be preferred in structures that are intended to be more permanent.

As discussed in more detail below, slit-tube longerons can have non-circular cross sections. Embodiments include, for example and not by way of limitation, longerons having a curved cross-sectional profile, such as an oval-shaped profile, elliptical, parabolic, or irregular-shaped profile, such as a profile that is substantially flat with one or more curved edges. See FIG. 15F, for example. Moreover, some embodiments can include longerons with cross-sectional profiles having roughly straight edges, such as a polygonal profile, as well as closed-out cross-sectional profiles (i.e., profiles having no slit).

Embodiments can include longerons having no slit along the longitudinal length of the longeron, but embodiments also can include slit-tube longerons having various means of closing out or securing the slits, once deployed. Among other things, this enables a slit-tube longeron to carry shear across the slit. For example, as shown in FIGS. 15A-15F, embodiments can include fasteners 1515 at and/or near one or more of the edges of the slit tube longeron 1500 to close the slit tube longeron 1500 in a longitudinal shape. Such fasteners 1515 can be located on, and/or embedded in, one or more surfaces of the slit tube longeron 1500.

Figure 15A:
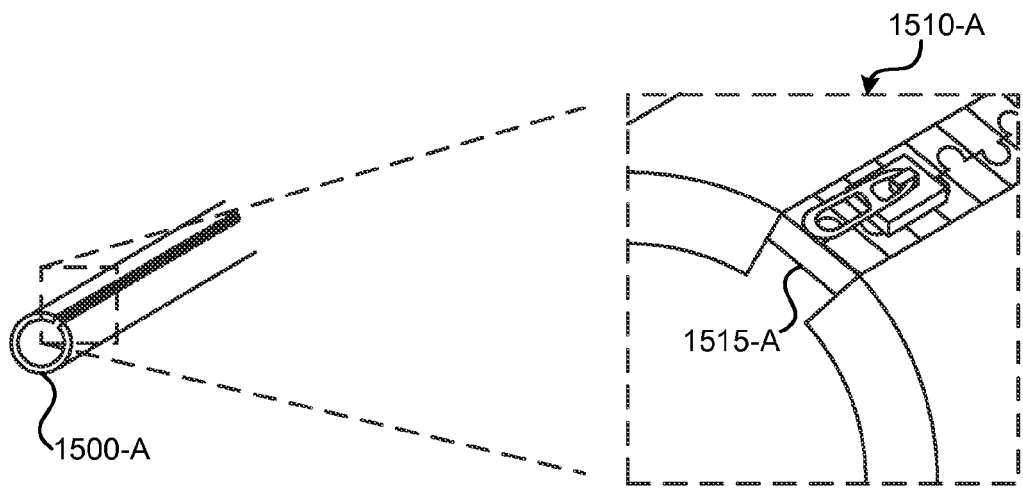
FIGS. 15A-15F show various types of fasteners to close slit-tube longerons in a deployed configuration, according to some embodiments.

FIG. 15A illustrates an embodiment of a slit-tube longeron 1500-A with a first type of fastener. The close-up 1510-A shows a zipper 1515-A located at the edges of the slit of the slit-tube longeron 1500-A. When the slit-tube longeron 1500-A is deployed, all or a portion of the zipper 1515-A may be zipped together, thereby closing the slit-tube longeron 1500-A in the longitudinal shape. Zippers and similar close out fasteners using interlocking members and/or surfaces (including hook-and-loop fasteners such as Velcro®) can be utilized in various applications of deployable structures, particularly in portable applications.

Figure 15B:
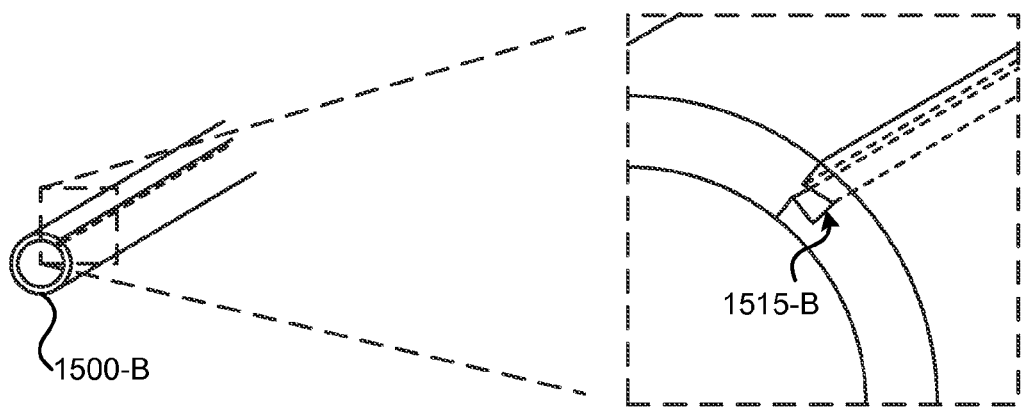

FIG. 15B illustrates another embodiment of a slit-tube longeron 1500-B wherein the edges 1515-B of the slit are shaped to interlock once the slit-tube longeron 1500-B is deployed. Such interlocking means may be adapted to interlock automatically when deployed, or may be configured to require additional force for the edges to interlock. The additional force may be provided by hand or tool.

Figure 15C:
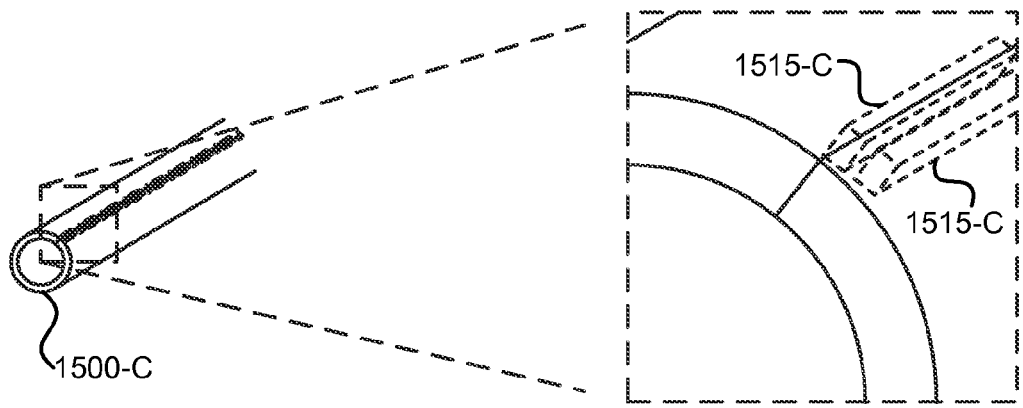

FIG. 15C illustrates how magnets 1515-C may be embedded in the surface of one or both edges of the slit-tube longeron 1500-C. Although shown as discrete magnets 1515-C, embodiments also contemplate magnets 1515-C that extend for the entire length of the slit. Additionally or alternatively, magnets 1515-C may be located on one or more surfaces of the slit-tube longeron 1500-C.

Figure 15D:
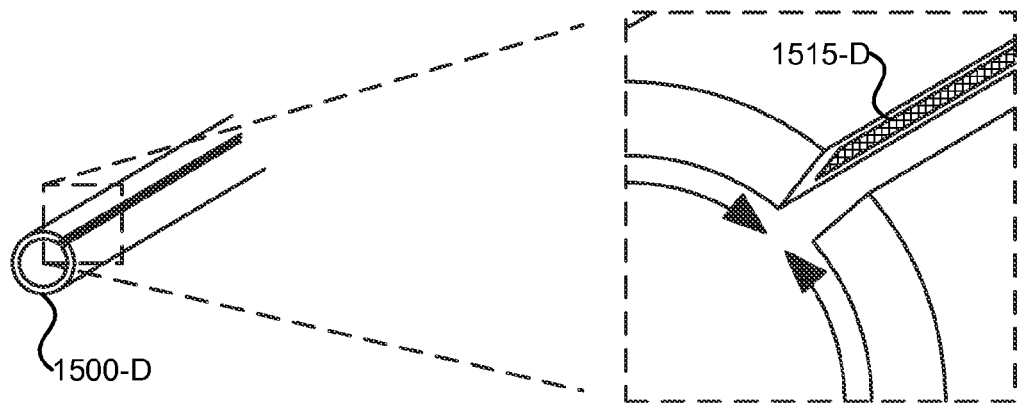
Figure 15E:
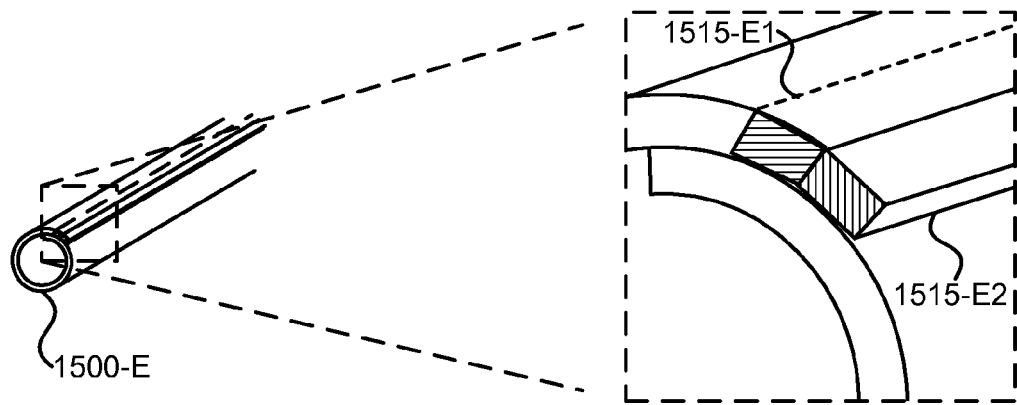

FIG. 15D illustrates how a slit-tube longeron 1500-D can have one or more surfaces at the edge of the slit that are at least partially covered with an adhesive 1515-D. This can include a chemical adhesive, such as an epoxy or glue. Depending on the desired functionality, the adhesive 1515-D may permanently or temporarily close out the slit after coming in contact with an opposing surface of the slit-tube longeron 1500-D. Additionally or alternatively, one or more latches may be used to close out the slit of a slit-tube longeron 1500.

Where the slit of a slit-tube longeron is formed by overlapping edges, one or more fasteners may be located at or near the outside and/or inside surface of the longeron where the edges overlap. FIG. 15E, for example, illustrates how such fasteners may be utilized in a slit-tube longeron 1500-E with overlapping edges. In this embodiment, a fastener is comprised of two magnets: one magnet 1515-E1 embedded in and extending along the surface of the outer overlapping edge, and another magnet 1515-E2 is disposed on the outer surface of the inner overlapping edge. Thus, when the slit-tube longeron 1500-E is deployed, the magnets 1515-E close out the slit and ensure the overlap of the overlapping edges. It will be understood that alternative embodiments can include numerous variations on the type of fasteners and their location relative to the overlapping edges of the slit-tube longeron 1500-E.

Figure 15F:
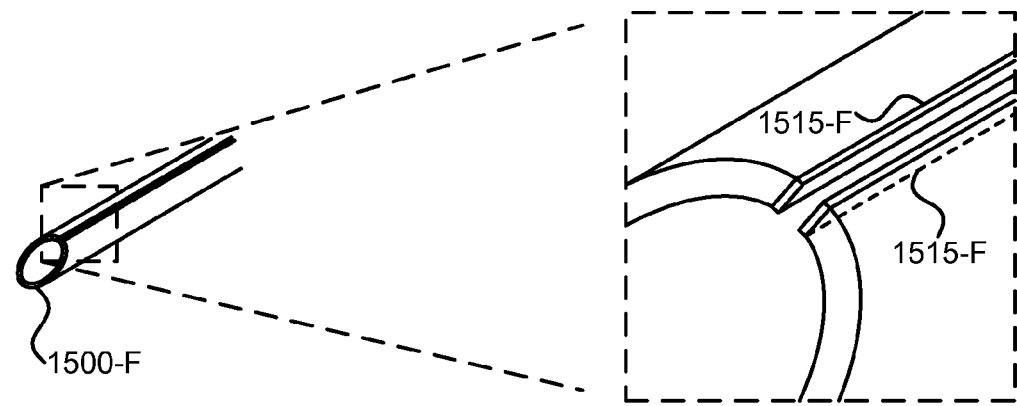

As discussed above, slit-tube longerons may have non-circular profiles. FIG. 15F illustrates such a slit-tube longeron 1500-F having a non-circular profile. The slit-tube longeron 1500-F can include a slit defined by non-overlapping edges 1515-F, but also can include fasteners for closing out the slit, as discussed above. Additionally or alternatively, the non-circular slit-tube longeron 1500-F can include overlapping edges and/or edges creating a large slit, in a manner similar to the circular profiles illustrated in FIG. 14 and discussed above.

FIGS. 16A-16E illustrate additional, non-circular cross-sectional profiles of longerons, according to certain embodiments. Such longerons can be utilized in a variety of deployable structures, and the type of longeron used can vary depending on desired functionality, among other considerations. FIGS. 16A-16E are examples of and are not intended to be limiting.

Various non-circular cross-sectional profiles are contemplated. FIG. 16A, for example, illustrates an oval-shaped cross-sectional profile 1600-A. Such a profile 1600-A can be closed out as shown, or can have a slit (e.g., a gap and/or an overlap). FIG. 16B shows a parabolic cross-sectional profile 1600-B having a relatively large gap.

FIG. 16C illustrates yet another cross-sectional profile 1600-C having particularly large gap. This profile 1600-C includes a substantially flat portion 1610C extending along a plane 1630C. The embodiment shown in FIG. 16C further includes two curved edges 1620C extending in a direction out of the plane 1630C of the substantially flat portion 1610C.

The term "substantially flat," as used herein, is used broadly. For example, the substantially flat portion 1610C of the profile 1600-C shown in FIG. 16C can include some degree of bowing or other physical characteristics that may cause a part of the substantially flat portion 1610C to deviate out of the plane 1630. However, insomuch as the inner surface of the substantially flat portion 1610C generally faces a direction perpendicular to the plane 1630C, the substantially flat portion 1610C can be considered "substantially flat." In the profile 1600-C provided in FIG. 16C, such a substantially flat surface 1610C can be coupled with solar cells and oriented such that the substantially flat surface 1610C faces the sun, providing higher electrical-conversion efficiencies for the solar cells.

FIG. 16D shows a profile 1600-D having a semi-parabolic shape with curved edges. Such a shape, which can be viewed as a combination of profiles 1600-B and 1600-C in FIGS. 16B and 16C, illustrates how profiles may not adhere to a particularly-defined shape, but may comprise a combination of shapes and features, which may not be expressly disclosed herein. Finally, FIG. 16E shows a profile 1600-E having an elliptical shape. This profile 1600-E can be closed out, as shown, or may have a slit or gap, depending on desired functionality.

Figure 17A:
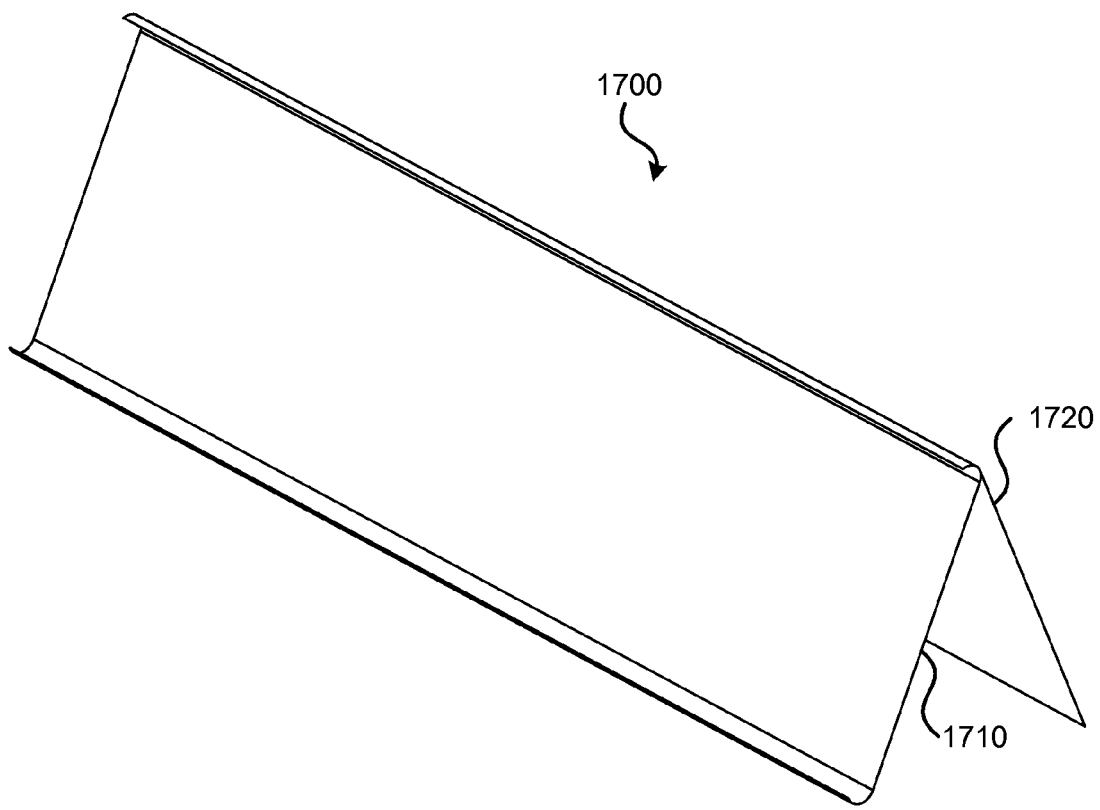
FIGS. 17A-17C show embodiments of a deployable solar array panel comprising an expandable structural member.
Figure 17B:
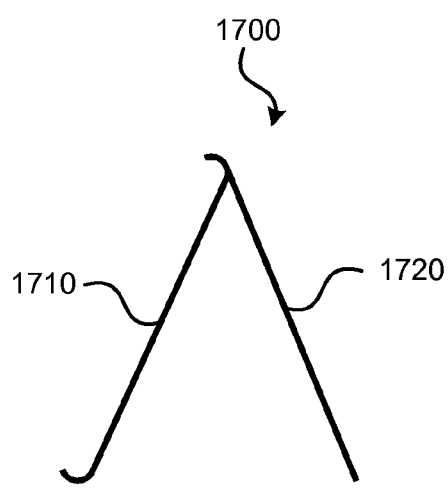
Figure 17C:
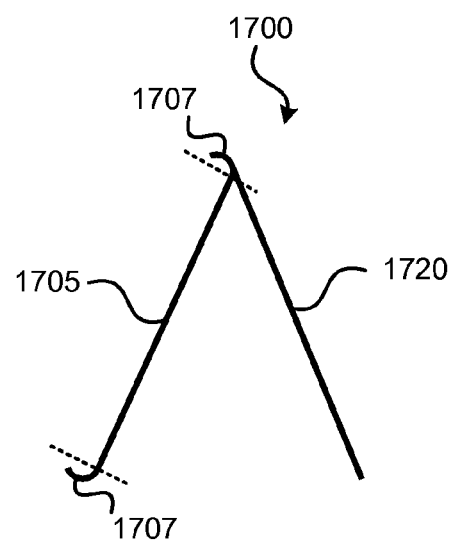

FIGS. 17A-17C illustrate embodiments of a deployable solar array panel 1700. Embodiments can include a front structural member 1710 and a back structural member 1720. FIG. 17B, which shows a cross-sectional profile of the solar array panel 1700, illustrates how the front structural member 1710 can be a single-bodied structural member. For example, this single-bodied structural member can be a longeron with a cross-sectional profile similar to the profile 1600-C shown in FIG. 16C. In the deployable solar array panel 1700, the substantially flat portion can be coupled with photovoltaic cells (not shown) to enable the deployable solar array panel 1700 to be directed toward a light source. Furthermore, the deployable solar array panel can be stowed by rolling along the longitudinal length of the front structural member 1710 and stowed by rolling the stowed roll in the opposite direction. The back structural member 1720 can be detached and stowed separately, or rolled together with the front structural member 1710.

FIG. 17C shows a cross-sectional profile of another embodiment of the solar array panel 1700, illustrating how the front structural member 1710 can be formed by separate structural elements. For example, the front structural member 1710 can comprise one or more longerons 1707. The one or more longerons 1707 can be slit-tube longerons, such that a cross-sectional profile of the one or more longerons 1707 along at least a portion of the one or more longerons 1707 comprises two edges. The two longerons 1707 shown in the embodiment of FIG. 17C, for example, are slit-tube longerons having cross-sectional profile with a wide gap, similar to the cross-sectional profile illustrated in FIG. 14D. Alternatively, however, one or both of the longerons 1707 can have a different cross-sectional profile, such as a non-circular profile and/or semi-circular profile.

As shown in FIG. 17C, each longeron 1707 can be coupled with a connecting element 1705 at one of the longeron's edges. The connecting element 1705 can be a structural member with a substantially flat surface along at least a portion of the longitudinal length of the front structural member 1710. Photovoltaic cells (not shown) can be coupled with the substantially flat surface of the connecting element 1703. Stowage and deployment of the embodiment in FIG. 17C can be similar to that of the embodiment in FIG. 17B.

The deployable solar array 1700 of FIGS. 17A-17C can include various additional features. For example, it can include one or more support elements, which can extend laterally at certain locations along the front structural member 1710 to provide added support. Such structures can include battens, longerons, and/or a sheet of rigid material. Additionally or alternatively, the photovoltaic cells can comprise a photovoltaic cell laminate, which can encompass the entire front structural member 1710 and/or any support elements. The laminate can effectively unify various elements (e.g., longerons, battens, and/or other structural members within the laminate) into a single, laminated structure.

Figure 18A:
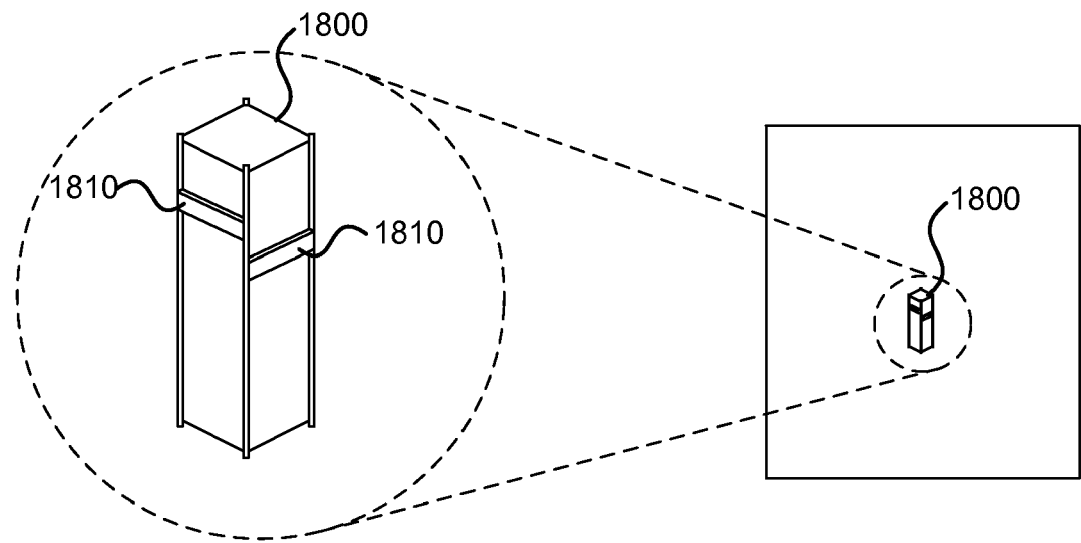
FIGS. 18A-18B show an embodiment of a satellite structure with an atmospheric drag sail.
Figure 18B:
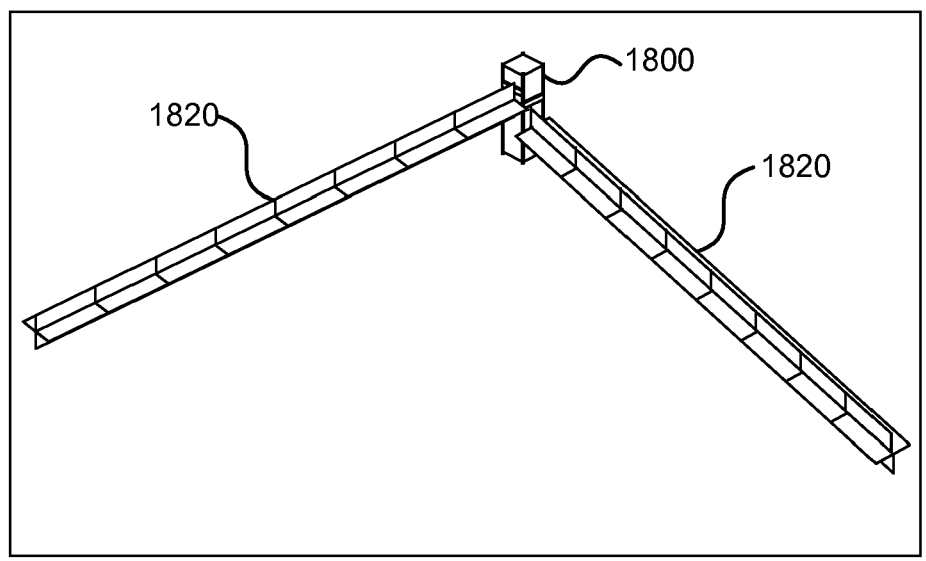

FIGS. 18A and 18B illustrate a satellite structure 1800 with an atmospheric drag sail 1820 that utilizes the collapsible/expandable longerons disclosed herein. FIG. 18A, for example illustrates the satellite structure with the atmospheric drag sail (not shown) stowed, but with access doors through which the atmospheric drag sails can be deployed.

FIG. 18B illustrates the deployed atmospheric drag sails 1820, with which the satellite structure 1800 can de-orbit at the end of its useful life.

The physical characteristics of the atmospheric drag sails 1820 can vary. For example, a drag sail can include two "wings" that extend outward when deployed, similar to the embodiment shown in FIG. 8. Alternatively, this can include a single-wing structure. The wings and main body of the drag sails can include a pliable, lightweight material. For example, biaxially-oriented polyethylene terephthalates (boPETs), such as Mylar®, Melinex®, Hostaphan®, and/or other polyester films can provide the durability and pliability to create a deployable atmospheric drag sail.

Figure 19A:
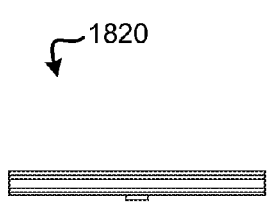
FIGS. 19A-19E show an embodiment of an atmospheric drag sail including a longeron.
Figure 19B:
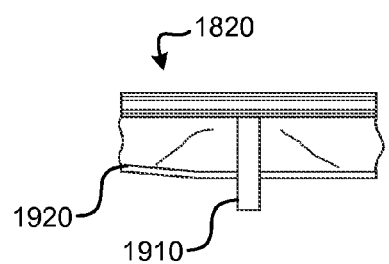
Figure 19C:
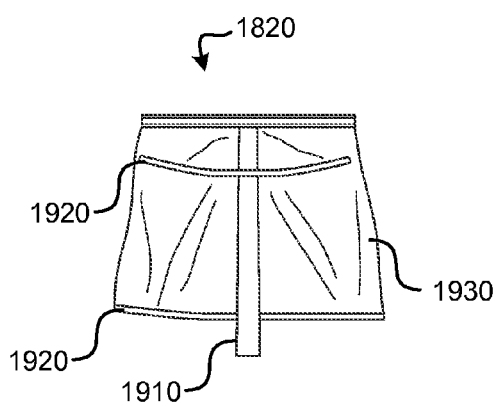
Figure 19D:
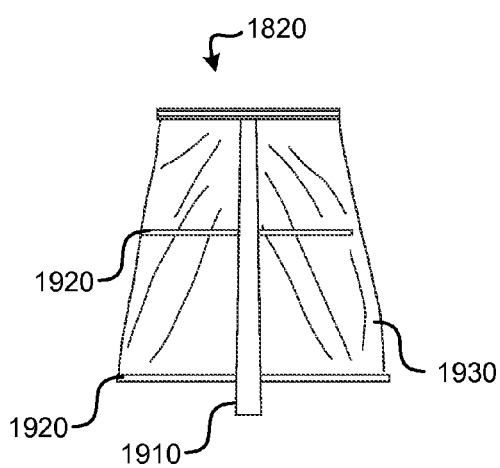
Figure 19E:
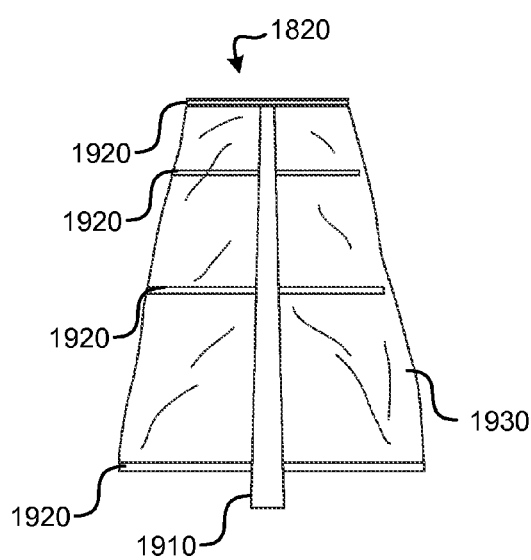

FIGS. 19A-19E illustrate an embodiment of an atmospheric drag sail 1820 at various states of deployment, ranging from fully stowed, as shown in FIG. 19A, to fully deployed, as shown in FIG. 19E. In this embodiment, a central longeron 1910 is released from its stowed position, and the stored strain energy causes the longeron 1910 to unroll. The longeron 1910 can be coupled with one or more battens 1920 that extend in a dimension perpendicular to the longitudinal length of the longeron 1910 such that, as the longeron 1910 unrolls, a large sheet of pliable, lightweight material 1930 deploys to increase the surface area of the satellite structure 1800. The increased surface area increases drag and can cause the orbit of the satellite structure 1800 to decay at an increased rate. Alternative embodiments can include additional longerons, including slit-tube, circular, and/or non-circular longerons any or all of which can be included in embodiments of similar terrestrial structures.

Having fully described several embodiments, many other equivalent or alternative embodiments of deployable structures utilizing collapsible members will be apparent to those of skill in the art. These alternatives and equivalents are intended to be included within the scope of the invention, as defined by the following claims.

What is claimed is:

1. A deployable solar array comprising:
  a single-bodied structural member, expandable along a longitudinal length, wherein a cross-sectional profile of the single-bodied structural member along at least a portion of the longitudinal length includes:
    a substantially flat portion extending along a plane; and
    curved edges extending in a direction out of the plane of the substantially flat portion, wherein the curved edges form a gap that extends longitudinally along the longitudinal length of the single bodied structural member; and
  a plurality of photovoltaic cells coupled with the substantially flat portion of the single-bodied structural member;
  wherein the single-bodied structural member and the plurality of photovoltaic cells are configured to be stowed as a roll comprising the single-bodied structural member and the plurality of photovoltaic cells, wherein the roll is configured to deploy by being rolled along the longitudinal length of the single-bodied structural member.

2. The deployable solar array of claim 1, further comprising one or more support elements coupled with the single-bodied structural member.

3. The deployable solar array of claim 2, wherein the one or more support elements includes:
  a longeron,
  a batten, or
  a sheet comprising rigid material.

4. The deployable solar array of claim 1, wherein the plurality of photovoltaic cells comprise a photovoltaic cell laminate.

5. The deployable solar array of claim 4, wherein the single-bodied structural member is laminated within the photovoltaic cell laminate.

6. The deployable solar array of claim 4, further comprising one or more battens, wherein the one or more battens are laminated within the photovoltaic cell laminate.

7. A deployable solar array comprising:
one or more longerons, expandable along a longitudinal length and having:
a gap that extends longitudinally along the longitudinal length of the one or more longerons such that a cross-sectional profile of the one or more longerons along at least a portion of the one or more longerons comprises two edges;
a structural member coupled with the one or more longerons at one of the two edges of the cross-sectional profile of the one or more longerons, wherein the structural member has a substantially flat surface along at least a portion of the longitudinal length of the one or more longerons; and
a plurality of photovoltaic cells coupled with the substantially flat surface of structural member;
wherein the one or more longerons, the structural member, and the plurality of photovoltaic cells are configured to be stowed as a roll comprising the one or more longerons, the structural member, and the plurality of photovoltaic cells, wherein the roll is configured to deploy by being rolled along the longitudinal length of the one or more longerons.

8. The deployable solar array of claim 7, wherein a cross-sectional profile of at least one of the one or more longerons is non-circular.

9. The deployable solar array of claim 7, wherein a cross-sectional profile of at least one of the one or more longerons comprises a fraction of a circle.

10. The deployable solar array of claim 7, further comprising one or more support elements coupled with the one or more longerons.

11. The deployable solar array of claim 10, wherein the one or more support elements includes:
a longeron,
a batten, or
a sheet comprising pliable or rigid material.

12. The deployable solar array of claim 7, wherein the plurality of photovoltaic cells comprise a photovoltaic cell laminate.

13. The deployable solar array of claim 12, wherein at least one of the one or more longerons is laminated within the photovoltaic cell laminate.

14. A deployable structure comprising:
one or more longerons, expandable along a longitudinal length, wherein each of the one or more longerons include a gap that extends longitudinally along the length of the longeron;
one or more battens coupled with the one or more longerons and configured to extend in a dimension perpendicular to the longitudinal length of the one or more longerons when the deployable structure is deployed; and
a pliable material coupled with either or both of:
the one or more longerons, or
the one or more battens;
wherein the one or more longerons, the one or more battens, and the pliable material are configured to be stowed as a roll comprising the one or more longerons, the one or more battens, and the pliable material, wherein the roll is configured to deploy by being rolled along a longitudinal length of the one or more longerons.

15. The deployable structure of claim 14, wherein the pliable material comprises a polyester film.

16. The deployable structure of claim 14, wherein the pliable material is configured to extend along the longitudinal length of the one or more longerons and extend in a dimension perpendicular to the longitudinal length of the one or more longerons when the deployable structure is deployed.

17. The deployable structure of claim 14, wherein the deployable structure comprises a spacecraft structure.

18. The deployable structure of claim 14, wherein at least one longeron of the one or more longerons has a gap along the longitudinal length of the at least one longeron.

19. The deployable structure of claim 18, wherein:
a curved cross-sectional profile of the at least one longeron is circular; and
the edges of the longeron that extend along the gap overlap circumferentially by up to 180 degrees.

20. The deployable structure of claim 14, wherein at least one longeron of the one or more longerons has a cross-sectional profile that substantially forms a shape comprising:
a circle,
an oval,
an ellipse,
a parabola,
a substantially flat shape with one or more curved edges, or
a polygon.

* * * * *